United States Patent
Cowlard et al.

(10) Patent No.: US 9,103,943 B2
(45) Date of Patent: Aug. 11, 2015

(54) ACQUISITION AND PROCESSING OF MULTI-SOURCE BROADBAND MARINE SEISMIC DATA

(75) Inventors: Andrew Paul Cowlard, Hildenborough (GB); Thomas Elboth, Oslo (NO); Bjorn Eino Rommel, Oslo (NO); Eric Johan de Graaff, The Hague (NE)

(73) Assignee: FUGRO-GEOTEAM AS, Oslo (NO)

( * ) Notice: Subject to any disclaimer, the term of this patent is extended or adjusted under 35 U.S.C. 154(b) by 628 days.

(21) Appl. No.: 13/540,207

(22) Filed: Jul. 2, 2012

(65) Prior Publication Data

US 2013/0135966 A1  May 30, 2013

Related U.S. Application Data

(60) Provisional application No. 61/654,234, filed on Jun. 1, 2012, provisional application No. 61/648,116, filed on May 17, 2012, provisional application No. 61/600,631, filed on Feb. 18, 2012, provisional application No. 61/581,400, filed on Dec. 29, 2011, provisional application No. 61/564,025, filed on Nov. 28, 2011.

(51) Int. Cl.
*G01V 1/38* (2006.01)
*G01V 1/36* (2006.01)

(52) U.S. Cl.
CPC ............ *G01V 1/3826* (2013.01); *G01V 1/3808* (2013.01); *G01V 1/36* (2013.01); *G01V 2210/1293* (2013.01); *G01V 2210/56* (2013.01)

(58) Field of Classification Search
CPC .............................................. G01V 1/38–1/393
USPC ....................................................... 367/15–24
See application file for complete search history.

(56) References Cited

U.S. PATENT DOCUMENTS 3,806,863 A  4/1974  Tilley et al.
4,353,121 A  10/1982  Ray et al.
(Continued)

FOREIGN PATENT DOCUMENTS

| GB | 2431237 A | 4/2007 |
|----|-----------|--------|
| WO | 8200365 | 2/1982 |
| WO | 2011086166 A1 | 7/2011 |

OTHER PUBLICATIONS

Monk, David, "Fresnel-zone binning: Fresnel-zone shapewith offset and velocity function", Geophysics, Jan.-Feb. 2010, pp. T9-T14, vol. 75, No. 1.

(Continued)

*Primary Examiner* — Ari M Diacou
(74) *Attorney, Agent, or Firm* — Patent Portfolio Builders PLLC

(57) ABSTRACT

A method and a system of acquiring and processing multi-source broadband marine seismic data in such a way that at least a part of said acquired data is partially or fully de-ghosted on the receiver side and then partially or fully re-assembled to a pre-stack dataset. At least one non-uniformly horizontal streamer is towed and at least two seismic sources emit seismic signals at spaced apart positions. Further presented is a method of processing marine seismic data by using the thus resulting notch diversity in these two (or more) seismic records to de-ghost the dataset, gathering two or more recorded seismic signals having substantially the same source-sensor offset and substantially the same common midpoint at different sensor depths, the sensor depths at least different enough to enable identification of seismic signals originating from ghosting. The gather is de-ghosted, thus obtaining seismic data with significantly broader bandwidth.

20 Claims, 10 Drawing Sheets

(56) References Cited

U.S. PATENT DOCUMENTS

| | | | |
|---|---|---|---|
| 4,486,864 A * | 12/1984 | Ongkiehong et al. | 367/23 |
| 4,532,618 A | 7/1985 | Wener | |
| 4,669,067 A * | 5/1987 | Roberts | 367/19 |
| 4,937,794 A * | 6/1990 | Marschall et al. | 367/21 |
| 4,992,992 A | 2/1991 | Dragoset, Jr. | |
| 5,051,960 A * | 9/1991 | Levin | 367/24 |
| 5,173,880 A * | 12/1992 | Duren et al. | 367/73 |
| 5,661,697 A * | 8/1997 | Swan et al. | 367/47 |
| 5,924,049 A * | 7/1999 | Beasley et al. | 702/17 |
| 6,590,831 B1 | 7/2003 | Bennett et al. | |
| 6,681,887 B1 | 1/2004 | Kragh et al. | |
| 6,882,938 B2 | 4/2005 | Vaage et al. | |
| 6,906,981 B2 | 6/2005 | Vaage | |
| 7,391,673 B2 | 6/2008 | Regone et al. | |
| 7,400,552 B2 | 7/2008 | Moldoveanu et al. | |
| 7,411,863 B2 | 8/2008 | Toennessen | |
| 7,561,491 B2 * | 7/2009 | Robinson | 367/43 |
| 7,710,821 B2 * | 5/2010 | Robertsson et al. | 367/24 |
| 7,742,876 B2 | 6/2010 | Robertsson | |
| RE41,656 E | 9/2010 | Robertsson et al. | |
| 7,817,495 B2 | 10/2010 | Ozbek et al. | |
| 8,116,166 B2 | 2/2012 | Robertsson et al. | |
| 2008/0165618 A1 | 7/2008 | Robertsson | |
| 2010/0142317 A1 * | 6/2010 | Moldoveanu et al. | 367/20 |
| 2011/0044127 A1 | 2/2011 | Kostov et al. | |
| 2011/0211422 A1 * | 9/2011 | Moldoveanu | 367/16 |
| 2011/0305109 A1 | 12/2011 | Soubaras | |
| 2013/0114375 A1 * | 5/2013 | Meier et al. | 367/21 |
| 2013/0121107 A1 * | 5/2013 | Yu | 367/19 |
| 2013/0135965 A1 * | 5/2013 | Ji et al. | 367/21 |
| 2014/0269169 A1 * | 9/2014 | van Borselen et al. | 367/15 |
| 2015/0063064 A1 * | 3/2015 | van Groenestjin | 367/21 |

OTHER PUBLICATIONS

Wapenaar, et al., "Green's function representations for seismic interferometry", Geophyscis, Jul.-Aug. 2006, pp. SI33-SI46, vol. 71, No. 4.

Strutt, "The Theory of Sound", 1894, vol. 1, MacMillan and Co. and New York. Google Digital Copy, 503 pages.

Soubaras, Robert, "Degohsting by joint deconvolution of a migration and a mirror migration", CGG Veritas, pp. 3406-3410, SEG Denver 2010 Annual Meeting.

Bearnth, et al., (http://www.onepetro.org/mslib/app/Preview.do?paperNumber=OTC-6338-MS&) Printed Oct. 31, 2011. Document Preview of: Bearnth, et al., "Broad-Band Recording Through Ghost Elimination", Offshore Technology Conference, p. 1, May 7-10, 1990, Houston, Texas.

Strutt, "The Theory of Sound", 1896, vol. 2, MacMillan and Co. and New York. Google Digital Copy, 535 pages.

Vermeer, Gijs J.O., et al. (http://www.onepetro.org/mslib/app/Preview.do?paperNumber=OTC-8314-MS&) Printed Oct. 31, 2011. Document Preview of: Vermeer, Gijs J.O., "Streamers vesus Stationary Receivers", Offshore Technology Conference, p. 1, May 5-8, 1997, Houston, Texas.

Hill, et al., (http://www.onepetro.org/mslib/app/Preview.do?paperNumber=OTC-8724 MS&) Printed Oct. 31, 2011. Document Preview of: Hill, et al., "Over/Under Deghosting: The Practical Aspects of Acquisition and Data Processing", Offshore Technology Conference, p. 1, Apr. 30-May 3, 2007, Houston, Texas.

Aki, et al., "Quantitative Seismology Theory and Methods", Theorems of Uniqueness and Reciprocity, pp. 25-28, W. H. Freeman and Company, New York.

Posthumus, B.J., "Deghosting Using a Twin Streamer Configuration", Geophysical Prospecting 41, 1993, pp. 267-286.

28. Hobbs, et al., "Marine Source Signature Measurement Using a Reference Seismic Source", EAGE 62nd Conference and Technical Exhibition, pp. 1-4, May 29-Jun. 2, 2000, Glasgow, Scotland. (http://veritasweb3.veritasdgc.com/WebSite/VTechDocWeb.nsf/all/3EEC47296F3A8E2F87256CA500420FDF/$File/0019.pdf) Printed Oct. 31, 2011.

Ikelle, Luc T., (http://www.onepetro.org/mslib/app/Preview.do?paperNumber=OTC-8724 MS&) Printed Oct. 31, 2011. Document Preview of: Ikelle, Luc T., "Deghosting and Free-Surface Multiple Attentuation of Multi-Componen OBC Data", Offshore Technology Conference, p. 1, May 4-7, 1998, Houston, Texas.

Lynn, et al., (http://www.onepetro.org/mslib/app/Preview.do?paperNumber=OTC-4477-MS&) Printed Oct. 31, 2011. Document Preview of: Lynn, et al., "Effectiveness of Wide Marine Seismic Source Arrays", Offshore Technology Conference, p. 1, May 2-5, 1983, Houston, Texas.

Yilmaz, Özdogan, "Seismic Data Processing", Society of Exploration Geophysicists, pp. 9-81, 1987, Chapter 1.

Yilmaz, Özdogan, "Seismic Data Processing", Society of Exploration Geophysicists, pp. 384-427, 1987, Chapter 6.

* cited by examiner

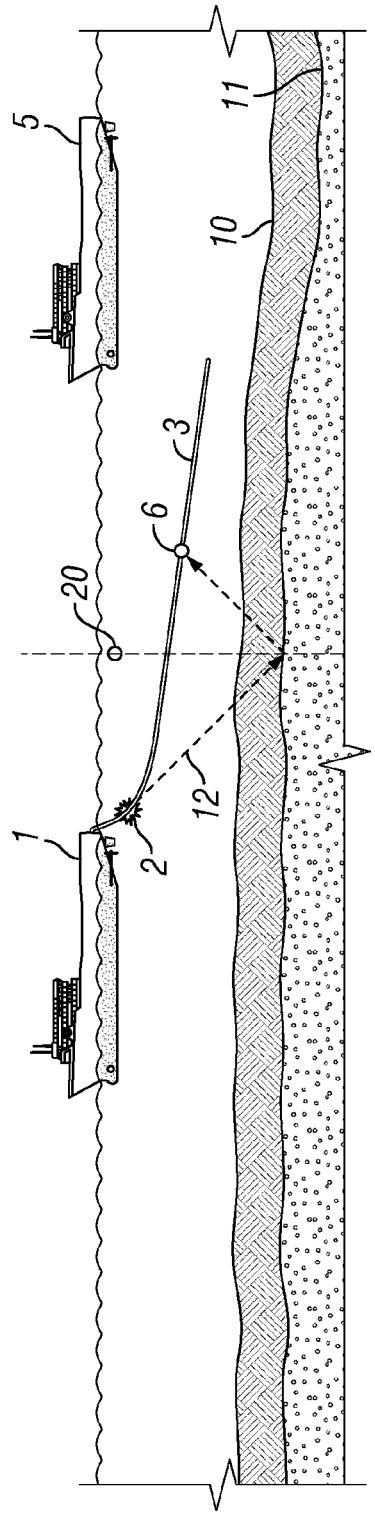
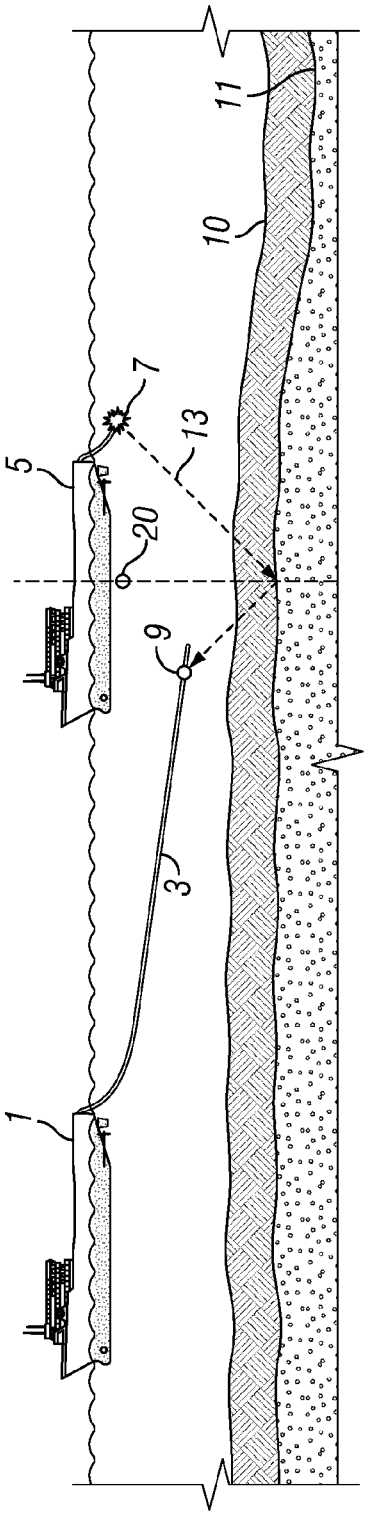
FIG. 4A
FIG. 4B

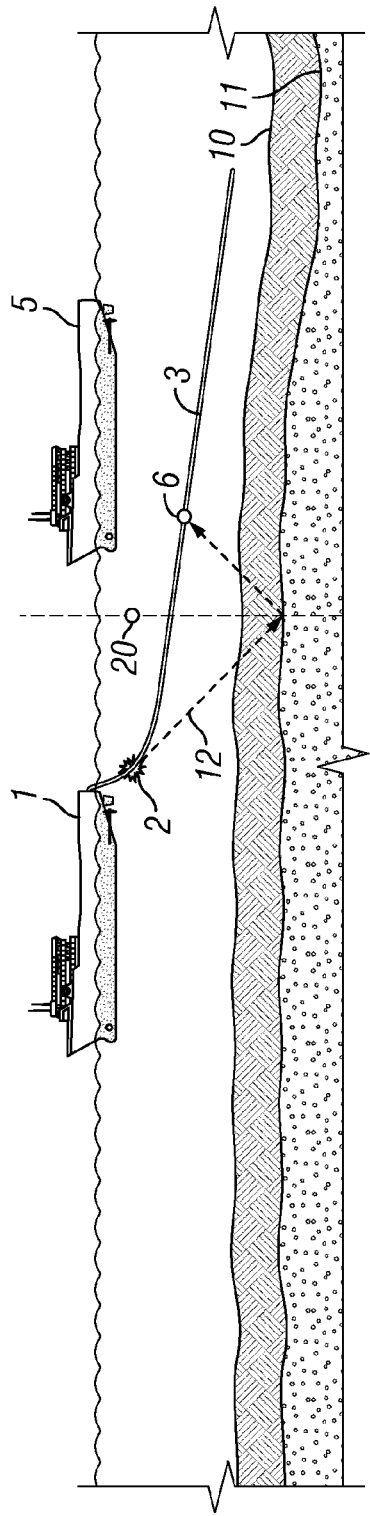
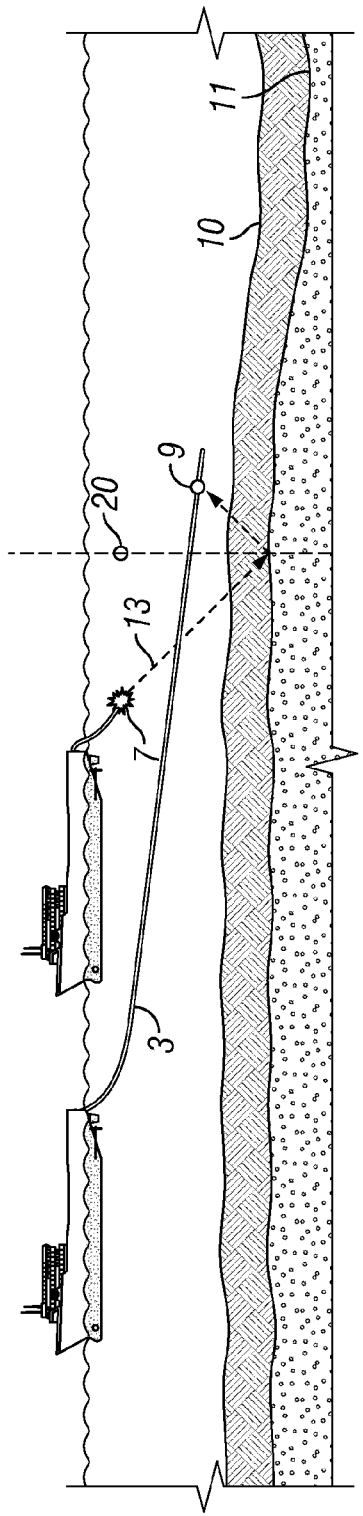

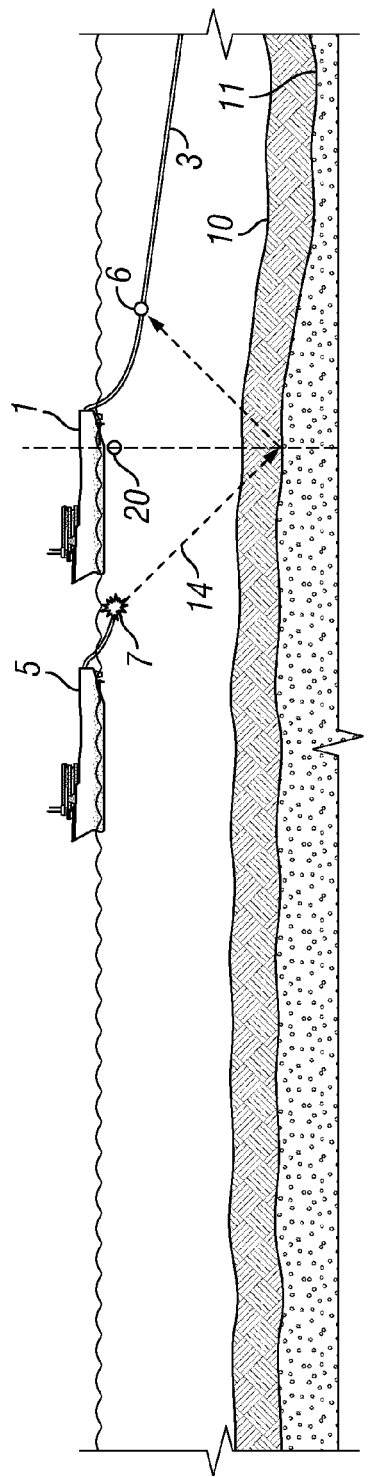
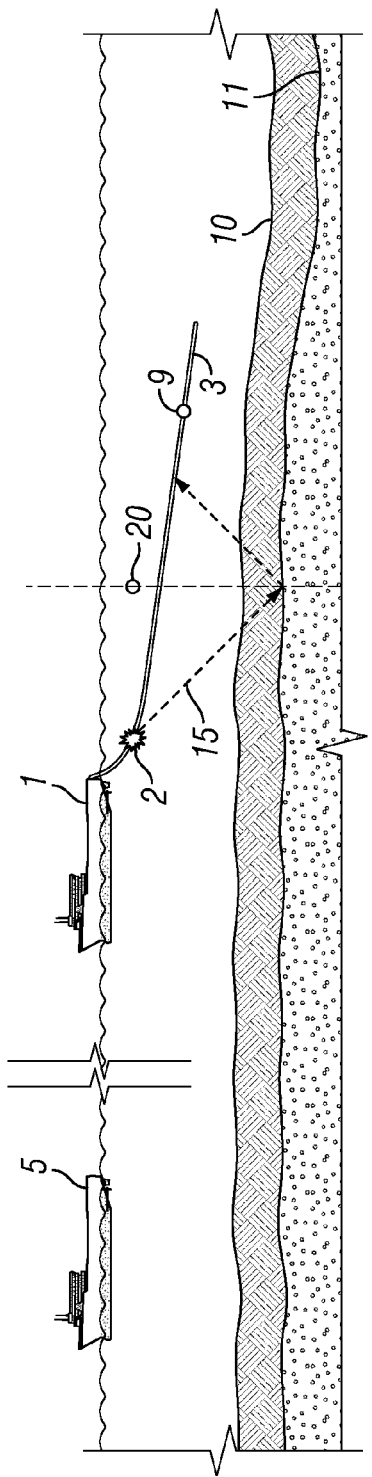

ACQUISITION AND PROCESSING OF MULTI-SOURCE BROADBAND MARINE SEISMIC DATA

CROSS REFERENCE TO RELATED APPLICATIONS

Background of Invention

1. Technical Field

Examples of the subject matter disclosed herein generally relate to methods and systems for seismic exploration and, in particular methods and systems for seismic data acquisition and seismic data processing directed to de-ghosting.

2. Discussion of the Background

Marine seismics, as used, for example, for exploration, field development, and production monitoring (time lapse), is normally conducted by towing long flexible cables with seismic sensors through the water. These cables, known as "streamers" to people skilled in the art, are equipped with a large number of seismic sensors with which recordings are made from subsurface reflections of acoustic energy that originate from a seismic source as, for example, a pressure source (air guns towed behind the seismic vessel). A towed array can include one or more streamers.

Each time a seismic source is activated, it emits a seismic signal that travels downward through the earth, is reflected, and, upon its return, is received by the seismic sensors in the streamer(s). Each streamer contains a plurality of seismic sensors at spaced apart locations. The received signals are recorded by recording devices. Recorded signals from multiple seismic source and seismic sensor combinations are then assembled and/or combined to create a nearly continuous profile of the subsurface that can extend for many miles. In a two-dimensional (2-D) marine seismic survey, the reflected signal is recorded by the seismic sensors on a single streamer, whereas in a three dimensional (3-D) survey a number of streamers are used simultaneously. In simplest terms, a 2-D seismic line can be thought of as a vertical slice of the earth layers directly beneath the streamer. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey.

A seismic streamer will typically be several kilometers long, and record several hundred traces at a time. It is normally equipped with compasses, acoustic pingers and depth sensors that give continuous location information about heading, position and depth. Furthermore, each streamer is typically equipped with attached units known as birds that control the heading and depth of that streamer.

Chapter 1, pages 9-89, of "Seismic Data Processing" by Özdogan Yilmaz, Society of Exploration Geophysicists, 1987, contains general information relating to conventional 2-D processing and its disclosure is incorporated herein by reference. General background information pertaining to 3-D data acquisition and processing may be found in Chapter 6, pages 384-427, of Özdogan Yilmaz.

A seismic trace is usually a digital recording of the acoustic energy that is received or otherwise picked up by one or more seismic sensors. Typically, a trace is determined by combining a group of seismic sensors over a certain length, in some examples referred to as a "receiver length" or "group length". In some examples, a group of seismic sensors is referred to as a "receiver". In marine seismic, this group length is typically between 3.125 meters and 12.5 meters, but in some examples, a seismic trace can also be a recording of a received seismic signal from one single seismic sensor. In some examples, a "seismic sensor" refers to a single seismic sensor or a group of seismic sensors ("receiver").

In seismic acquisition, the location point on the surface halfway between the center of the seismic source and the center of the seismic sensor is referred to as a common midpoint (CMP); it is typically shared by numerous pairs of seismic sources and seismic sensors. The CMP of every trace in a seismic survey is carefully tracked and is generally made a part of the trace header information. This allows the seismic information contained within the traces to be later correlated with specific surface and subsurface locations, thereby providing a means for placing and displaying the trace in its correct position. As will be further explained, information on the locations of said seismic sources and seismic sensors can be used for a variety of acquisition and or processing purposes.

A well-known problem in marine seismic acquisition is the occurrence of ghosting. It is known that some received seismic signals are reflected upward from the water bottom or underlying geologic beds and travel directly to the seismic sensor. These directly arriving seismic signals are generally desired for the purpose of reconstructing an image of the geologic beds. Some of the received seismic signals, however, arrive from the water bottom or underlying geologic beds after reflecting off the underside of the air-water interface at the water surface. These downward travelling signals arrive at the seismic sensor at a different time from the upward direct arrival. The difference in time between the two signals is dependent on the depth of the seismic sensor with respect to the water surface and the incidence angle. This additional reflection from the water surface is called a ghost, making the task of reconstructing an image of the geologic beds more difficult. Another type of ghosting occurs by reflection of the signal between the seismic source and the water surface, the reflected signal travelling downward to the water bottom and onward to the geologic beds.

One consequence of ghosting is that the ghosted signal combined with the direct arrival creates a distorted waveform. Depending on the depth of the seismic sensor (or seismic source) with respect to the water surface, the interaction of the direct signals and the ghosted signals will cause interference cancellation at some frequencies. In many examples, the cancellation frequencies are called "notch" frequencies. This frequency-dependent cancellation decreases the effective bandwidth of the received seismic signals, impairing the ability to reconstruct an image of the geologic beds. It is desired to have as broad of a bandwidth as possible, in order to increase the resolution and accuracy of the constructed geologic image form the seismic traces.

Ray et al, in U.S. Pat. No. 4,353,121, issued Oct. 5, 1982, addressed the problem of ghosting by using a streamer slanted in depth. Each of the seismic sensors in the streamer, being at a different depth, receives the ghost signal at a relatively different time from the direct arrival signal. This allowed for multiple primary and ghost reflections from a common interface to be gradually spaced apart. Ray phase reversed the ghost reflections and applied static shifts to correct for the different sensor depths. Normal-moveout correction was also applied to compensate for arrival times due to different source-sensor distances. The direct arrival (primary) reflections, being time aligned, could then be stacked to enhance the signal. The ghosted arrival reflections, likewise, could also be stacked to create a second enhanced signal. The two stacks were then combined (summed), with further time and phase correction, to further enhance the signal response. This technique was intended to replace the practice of applying inverse notch filters.

Dragoset, Jr., in U.S. Pat. No. 4,992,992, issued Feb. 12, 1991, further improved on the technique of Ray et al, by processing the recorded data to remove the time differences due to signals arriving at varying plane wave angles. Dragoset continues by aligning the primary signals and misaligning the ghost signals for processing and also separately aligning the ghost signals and misaligning the primary signals for processing, then summing the two resulting data sets.

As can be seen, over the years, considerable efforts have been made to widen the bandwidth of marine seismic data. It is well understood that broadband seismic data will allow for better and more accurate subsurface depiction. A core idea behind these efforts is to overcome the bandwidth limitation imposed by the receiver ghost (also known as "streamer ghost"). Looking in more detail, this ghost reflection is caused by the seismic signal itself as it is reflected off the sea surface. During this reflection, the signal inverts its polarity. When the up-going (subsurface reflection) and down-going (sea-surface reflection) signals meet, they cancel out (generate notches) at certain frequencies. For zero offset the receiver ghost generates notches around the following frequencies:

$$f = \frac{nv}{2z}, n = 0, 1, 2, \ldots,$$

where v is the wave velocity in water, and where z is the depth of the seismic sensor. The frequency content and the notch position of two idealized traces are illustrated in FIG. 1. In one example, the respective seismic sensors are positioned at depths of approximately 15 meters and 10 meters. However, the depths should only be taken as example of possible depths, and should in no way be interpreted as limiting the possible depth variations that might be applied in real acquisitions.

As illustrated, a deeper tow (streamer 1) improves the low frequency content of the signal compared to a more shallow tow (Streamer 2). However, the first and higher-order ghost notches come earlier on deeper streamer 1, compared to the more shallow tow of streamer 2.

The first non-zero frequency notch (v/2z) has historically been the limit of usable seismic bandwidth. To increase high-frequency (move the first notch to higher frequencies) content, one needs to move the cable shallower (smaller z). However, this may result in stronger swell noise and a deeper notch near zero Hz, and thus is detrimental to the low-frequency signals. Such low-frequency signals are very important in many geological settings such as subsalt plays in the Gulf of Mexico. A technique is therefore needed that can widen the bandwidth at both ends of the spectrum.

A further limitation with the prior art techniques is the inapplicability and difficulty in applying in the context of a 3-D acquisition environment and/or when using multiple seismic sources. In particular, the prior art techniques apply correction for normal moveout in order to perform the deghosting. This potentially interferes with 3-D pre-stack processing techniques. Ray et al discloses that focused noise out of the vertical plane is virtually eliminated. There is a need for deghosting acquisition and deghosting processing techniques that are less likely to interfere with 3-D pre-stack processing techniques.

SUMMARY OF INVENTION

In a first set of examples of the invention, a method and system for acquiring marine seismic data is provided, the method including the steps of: translating, by a first marine vessel, at least one first seismic source for emitting at least one first seismic signal; translating, by the first or at least one additional marine vessel, at least one additional seismic source for emitting at least one additional seismic signal; translating, by any marine vessel at least one streamer including at least one first seismic sensor for receiving the first seismic signal and at least one additional seismic sensor for receiving the additional seismic signal, with the at least one first and the at least one additional seismic sensor being arranged at different sensor depths for varying the frequency of suppression in the seismic signals due to ghosting; collecting information on the locations of the seismic sources and seismic sensors; arranging the first and additional seismic sources and the first and additional seismic sensors, based at least in part on their respective collected location information, for receiving, over time, at least one said first seismic signal emitted by a said first seismic source and received by a said first seismic sensor and at least one said additional seismic signal emitted by a said additional seismic source and received by a said additional seismic sensor, where the source-sensor offset of the emitting first seismic source and the receiving first seismic sensor is substantially the same as the source-sensor offset of the emitting additional seismic source and the receiving additional seismic sensor, and where the common mid-point of the emitting first seismic source and the receiving first seismic sensor is substantially the same as the common mid-point of the emitting additional seismic source and the receiving additional seismic sensor, and where the receiving first seismic sensor and the receiving additional seismic sensor are at different sensor depths, the sensor depths at least different enough to produce a discernible difference between the received seismic signals due to ghosting; receiving, over time, the seismic signals; and recording the received seismic signals.

In an example of the invention, acquired marine seismic data is processed by gathering those recorded seismic signals having substantially the same source-sensor offset and substantially the same common mid-point where at least two of the gathered recorded seismic signals are acquired using different sensor depths; in one example, aligning the gathered seismic signals in time; and de-ghosting the gathered seismic signals, whereby a synthesized record with a substantially de-ghosted seismic signal is created.

In an example of the invention, the first and additional seismic sources are actuated independently.

In an example of the invention, the first and additional seismic sources are actuated randomly. In some examples, actuating randomly includes using a pseudo-random number generator.

In an example of the invention, the first and additional seismic sources are actuated sequentially.

In an example of the invention, the first and additional seismic sources are actuated simultaneously.

In an example of the invention, at least one of the at least one streamer is translated by the first marine vessel.

In an example of the invention, at least one additional streamer is translated by the additional marine vessel.

In an example of the invention, the first or additional seismic sources are translated along a survey line. In a further example of the invention, the additional seismic source is translated ahead or behind the first seismic source along the survey line.

Here, in some examples, a survey line refers to the set of geographic coordinates in which the tow point of a particular streamer is located during an acquisition, where "tow point" refers to the device with which the towed streamer is attached to the towing vessel.

In an example of the invention, the first or additional seismic source is translated parallel and offset to the survey line. In a further example of the invention, the additional seismic source is translated ahead or behind the first seismic source parallel and offset to the survey line.

In an example of the invention, the first or additional seismic sources are translated at an angle to the survey line.

In a second set of examples of the invention, a method and system for acquiring and processing marine seismic data is provided, the method including the steps of: translating, by a first marine vessel, at least one first seismic source for emitting at least one first seismic signal; translating, by the first or at least one additional marine vessel, at least one additional seismic source for emitting at least one additional seismic signal; translating, by any marine vessel at least one streamer including at least one first seismic sensor for receiving the first seismic signal and at least one additional seismic sensor for receiving the additional seismic signal, with the at least one first and the at least one additional seismic sensor being arranged at different sensor depths for varying the frequency of suppression in the seismic signals due to ghosting; collecting information on the locations of said seismic sources and seismic sensors; arranging said first and additional seismic sources and said first and additional seismic sensors, based at least in part on their respective collected location information, for receiving, over time, two or more of a first seismic signal emitted by a first seismic source that is received by a first seismic sensor and an additional seismic signal emitted by an additional seismic source that is received by an additional seismic sensor, where the offset between the seismic source and the seismic sensor of the emitting first seismic source and the receiving first seismic sensor is substantially the same as the offset between the seismic source and the seismic sensor of the emitting additional seismic source and the receiving additional seismic sensor, and where the common mid-point of the emitting first seismic source and the receiving first seismic sensor is substantially the same as the common mid-point of the emitting additional seismic source and the receiving additional seismic sensor, and where the receiving first seismic sensor and the receiving additional seismic sensor are at significantly different sensor depths, the sensor depths at least different enough to enable identification of seismic signals originating from ghosting; receiving, over time, the seismic signals; recording the received seismic signals; gathering two or more recorded seismic signals having substantially the same source-sensor offset and substantially the same common mid-point and significantly different sensor depths; and de-ghosting the gathered two or more recorded seismic signals, whereby a synthesized record with a substantially de-ghosted seismic signal is created.

In an example of the invention, actuation of the first and additional seismic sources is selected from the group of: actuating independently, actuating sequentially, and actuating simultaneously.

In an example of the invention, the first and additional seismic sources are actuated independently.

In an example of the invention, the first and additional seismic sources are actuated randomly. In some examples, actuating randomly includes using a pseudo-random number generator.

In an example of the invention, the first and additional seismic sources are actuated sequentially.

In an example of the invention, the first and additional seismic sources are actuated simultaneously.

In an example of the invention, at least one of said at least one streamer is translated by the first marine vessel.

In an example of the invention, at least one additional streamer is translated by the additional marine vessel.

In an example of the invention, said first or additional seismic sources are translated along a survey line. In a further example, the additional seismic source is translated ahead or behind the first seismic source along the survey line.

In an example of the invention, said first or additional seismic source is translated parallel and offset to a survey line. In a further example, the additional seismic source is translated ahead or behind the first seismic source parallel and offset to the survey line.

In an example of the invention, the first or additional seismic sources are translated at an angle to a survey line.

In an example of the invention, de-ghosting comprises brute stacking.

In an example of the invention, de-ghosting comprises pre-stack de-convolution, and stacking.

In an example of the invention, de-ghosting comprises matched filtering, pre-stack de-convolution, and stacking.

In an example of the invention, de-ghosting comprises inversion.

In an example of the invention, a record of a first or an additional signal is transformed by means of applying reciprocity into a record that would have been obtained if the source and sensor location of said record were interchanged.

In an example of the invention, the method further includes gathering a plurality of synthesized records having a substantially common mid-point.

In a third set of examples of the invention, a method and system for processing marine seismic is provided, the method including the steps of: gathering two or more recorded seismic signals having substantially the same source-sensor offset and substantially the same common mid-point where at least two of the gathered recorded marine seismic signals are acquired using different sensor depths, the sensor depths at least different enough to enable identification of seismic signals originating from ghosting; de-ghosting the gathered two or more recorded seismic signals, whereby a synthesized record with a substantially de-ghosted seismic signal is created.

In an example of the invention, de-ghosting includes brute stacking.

In an example of the invention, de-ghosting includes pre-stack de-convolution, and stacking.

In an example of the invention, de-ghosting includes matched filtering, pre-stack de-convolution, and stacking.

In an example of the invention, the step of de-ghosting includes inversion.

In an example of the invention, where a record of a first or an additional signal is transformed by means of applying reciprocity into a record that would have been obtained if the source and sensor location of said record were interchanged.

In an example of the invention, the method includes gathering a plurality of synthesized records having a substantially common mid-point.

BRIEF DESCRIPTION OF THE DRAWINGS

In the following, preferred embodiments of the invention are depicted with reference to the accompanying Figures, in which:

FIGS. 4A and 4B show schematically a profile view of the example of a marine acquisition of FIG. 3, as seen in profile view; FIG. 4A shows the acquisition geometry in one position at a first time; FIG. 4B shows the acquisition geometry in a second position at a second time;

FIGS. 5A and 5B show schematically a profile view of another example of a marine acquisition geometry, as seen in profile view; FIG. 5A shows the acquisition geometry in one position at a first time; FIG. 5B shows the acquisition geometry in a second position at a second time;

FIGS. 6A and 6B show schematically a profile view of another example of a marine acquisition geometry, as seen in profile view; FIG. 6A shows the acquisition geometry in one position at a first time; FIG. 6B shows the acquisition geometry in a second position at a second time;

FIG. 7A shows the acquisition geometry in one position at a first time; FIG. 7B shows the acquisition geometry in a second position at a second time;

FIG. 8A shows the acquisition geometry in one position at a first time; FIG. 8B shows the acquisition geometry in a second position at a second time;

DETAILED DESCRIPTION

Figure 1:
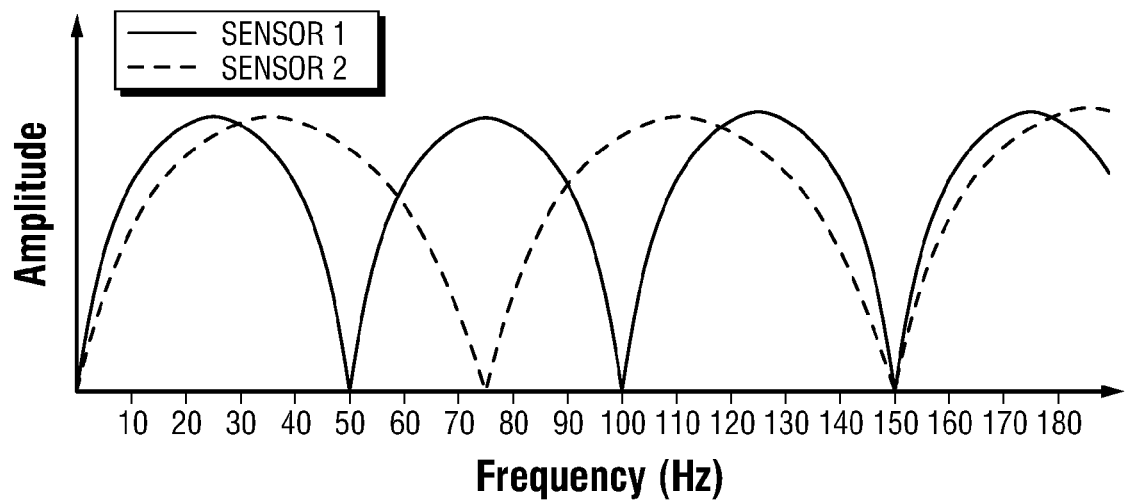
FIG. 1 shows an idealized frequency spectrum of marine seismic data received by two streamers being towed at a depth of 15 meters and 10 meters, respectively.

As previously presented, the frequency content and the notch positions of two idealized traces are illustrated in FIG. 1. In this example, the respective seismic sensors are positioned at depths of approximately 15 meters and 10 meters, respectively. However, these sensor depths should only be taken as examples of possible depths, and should in no way be interpreted as limiting the possible depth variations that might be applied in real acquisitions. Note, the seismic signal from Sensor 1 shows larger spectral amplitudes at low frequencies than the seismic signal from Sensor 2. On the other hand, the seismic signal from Sensor 2 shows notches at higher frequencies than the seismic signal from Sensor 1. Also, remember, the frequency spectrum of such an idealized trace, as shown, will be superposed by that of the emitting seismic source and the earth filter, thus limiting the frequency spectrum of an actually recorded trace. Furthermore, for conventional seismic the actual useable frequency spectrum, the "bandwidth", is typically defined to extend up to the first frequency notch.

In contrast, the present invention envisions to extend the bandwidth beyond the first frequency notch and, at best, up to the frequency spectrum of the seismic source and the earth filter. To that end, as is well known within the field of seismic processing, such seismic signals with diverse frequency notches can be used to remove or diminish the influence of the ghost on the seismic signal—a process known as "de-ghosting". By properly combining the seismic signals it is also possible to flatten the frequency spectrum. In this way, seismic data are obtained with significantly broader bandwidth relative to conventional seismic data.

Generally, the seismic sensors that record seismic signals may differ—in fact, the acquisition is advantageously designed to make them differ—in the depth in which the respective seismic sensors have been positioned; consequently, if that is indeed the case, the seismic signals differ in the time delay with which the respective ghosts arrive at the respective seismic sensors and, in turn, in the respective frequency notches in their respective frequency spectra. Any such set of records can, as a person skilled in the art will recognize, be combined in such a way that the combined (sometimes referred to as "synthetic") record is substantially de-ghosted, as defined above. The specific method of combination may vary, and by way of illustrating different methods without limitation: one such method is brute stacking; another one such method is a combination of matched filter, stack, and post-stack deconvolution described by Posthumus in "Deghosting Using a Twin Streamer Configuration", Geophysical Prospecting, 1993; another one such method is the one described by Soubaras in "Deghosting by Joint Deconvolution of a Migration and a Mirror Migration", SEG Abstract, 2010. Either way, as said above, a combined or synthetic trace with a substantially de-ghosted record is created.

As a person skilled in the art knows well, the seismic signals recorded in a marine dataset are inherently contaminated with their ghosts: in fact, one on each the source and receiver side, where the time delay between a seismic signal and its ghost is governed by the velocity of sound in water, by the incidence angle of the seismic signal with respect to the sea surface, and, most importantly, by the depth of seismic source and seismic sensor, respectively.

In a conventional marine acquisition deploying a uniformly horizontal streamer at a constant depth, as far as operationally possible, of a few meters below the sea surface, the time delay of a receiver-side ghost of a seismic signal differs insignificantly with offset, thus making a seismic signal and its ghosts superpose to an insignificantly varying composite seismic signal. In contrast, in one example, the envisioned marine acquisition deploys a non-uniformly horizontal streamer that spreads over a range of depths below sea surface, the time delay of the receiver-side ghost of a seismic signal differs significantly with offset, thus creating a significantly varying composite seismic signal. "Varying significantly", in this example, shall mean, as depicted in FIG. 1, that (1) for each spectral frequency within a certain seismic bandwidth there is at least one record in which the spectral amplitude of said composite seismic signal exceeds that of the inevitable noise, and that (2) said seismic bandwidth shall include at least one notch frequency, as defined above, in at least one record of said composite seismic signal. Here, the second part shall only indicate that the seismic bandwidth can, and usually will, be extended beyond the (lowermost) first notch frequency, in contrast to what in conventional processing is usually considered its upper limit.

Whatever method is used, however, in the thus constructed synthesized record, the offset, or a similar measure of distance, has lost any meaning—the thus constructed data are said to be "post-stack". In contrast, the present invention, in the several examples, envisions to acquire at least two datasets such that a common mid-point common offset gather contains at least two traces such that stacking these multiple traces creates a stack trace that is still characterized by an offset—in this sense, the thus constructed synthesized data can still be said to be "pre-stack".

As a person skilled in the art knows, every seismic record in a marine dataset is inherently contaminated with receiver ghost(s), and removing these receiver ghost(s) would advantageously increase the bandwidth of the seismic signal. Hence, the gist of the invention, in one example as presented herein, is made up of acquiring a marine dataset in such a way that multiple subsurface locations—that is, at least one subsurface location, but as many subsurface locations as technically, operationally, financially or otherwise feasible or viable—are illuminated by multiple seismic signals—that is, at least two seismic signals, but possibly several or many seismic signals—where said multiple seismic signals are contaminated with their respective different receiver ghost(s). In that case, processing is, principally, able to diminish or remove receiver ghost(s), viz. re-constructing ("synthesizing") an imaginary seismic signal that is not contaminated by any receiver ghost.

In geophysical terms, in some examples, the acquisition scheme is designed in such a way as to create multiple common mid-point common offset gathers—that is, at least one, but preferably as many ones as technically, operationally, financially or otherwise feasible or viable. However, above the solid earth, that is to say in the water, the ray paths may, and advantageously do so, differ in length. That is because seismic sensors shall, in fact, be placed at various sensor depths; and that is, in turn, because placing seismic sensors at various depths causes frequency notches to be generated at different centre frequencies. Then, each such gather contains the necessary replications mentioned above.

Therefore, in some examples, acquisition schemes are designed such as to meet conventional survey objectives, but also to maximize the number of common mid-point common offset gathers and, possibly, the number of traces within said gathers. Unfortunately, it is impractical to use a conventional acquisition scheme using a single marine vessel to produce the data needed for such common mid-point common offset gathering. Instead, it is practical to use at least one additional source vessel, as illustrated in the various examples further described herein.

According to one example of the invention, a method and a system for marine seismic surveying includes the steps of: translating, by a first marine vessel, at least one first seismic source for emitting a first seismic signal ("first" in connection with "seismic signal" is only for definition purposes and does not indicate any time related aspect of the signal, e.g. the "first" seismic signal does not necessarily have to be emitted earlier than the additional seismic signal); translating, by at least one additional marine vessel, at least one additional seismic source each for emitting an additional seismic signal; translating along a survey line (being the line along which the at least one streamer is towed) at least one non-uniformly horizontal streamer; providing at least two seismic sensors for receiving a first and an additional seismic signal, the two seismic sensors being arranged at different sensor depth below sea surface and at the same source-sensor offset; and, during the course of surveying, one of the seismic sensors receiving a first seismic signal and another one of the seismic sensors receiving an additional seismic signal such that the respective first and additional seismic signals have converged at and have been reflected in the same common depth-point.

A key feature of the present invention is creating a multiplicity of seismic records that substantially replicate a particular seismic signal such that de-ghosting the multiplicity of seismic records creates a single synthetic record of that particular seismic signal. In prior art methods of replicating a particular seismic signal, the records of seismic signals received at various offsets are de-ghosted, thus creating a full or partial post-stack synthetic record. In contrast, the present invention envisions de-ghosting records of substantially the same seismic signals of a common offset, thus creating a full or partial pre-stack record. To that end, seismic signals that share a common mid-point (CMP) are collected in a CMP gather and, among these, seismic signals that have travelled along substantially the same ray path, as defined herein, are collected in a common mid-point common offset (CMPO) gather. Then, de-ghosting said CMPO gather creates a synthetic record still belonging to its superordinate CMP gather. In this sense, the entirety of the now de-ghosted CMP gather is still considered pre-stack with reference to a particular seismic source, later to be termed first seismic source. In this example, creating a pre-stack gather with reference to a first seismic source is a key feature of the present invention.

For practical purposes, "source-sensor offset" means the horizontal distance between an emitting seismic source and a receiving seismic sensor.

For practical purposes, "substantially the same source-sensor offset" means such combinations of an emitting seismic source and a receiving seismic sensor with the same horizontal distance between the centers of small areas containing the point of the respective emitting seismic sources and the centers of small areas containing the point of the respective receiving seismic sensors, where said small areas are commonly known as bin or similar measure of tolerance.

Figure 2:
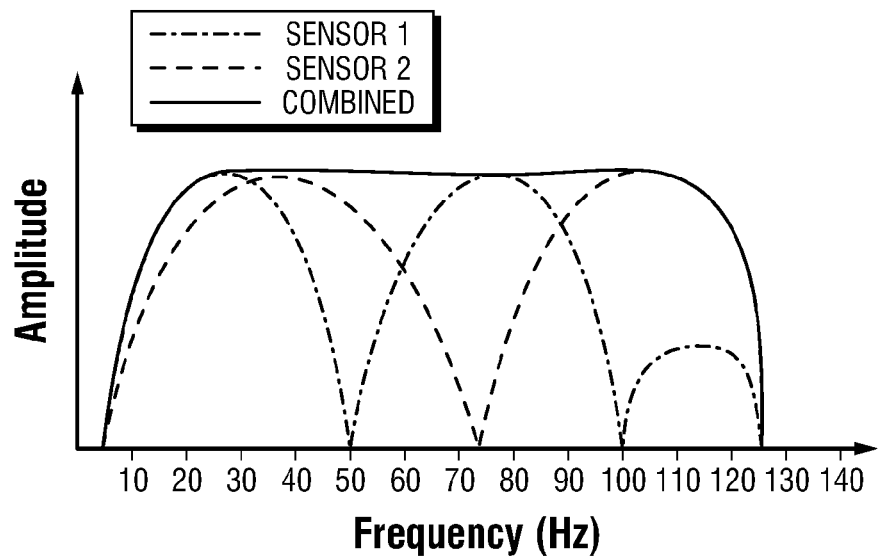
FIG. 2 shows an idealized resultant frequency spectrum of reconstructed (synthesized) ghost-free marine seismic record using two or more gathered recorded seismic signals, using two sensors receiving at different water depths.

FIG. 2 shows an idealized resultant frequency spectrum of reconstructed (synthesized) ghost-free marine seismic record using two or more gathered recorded seismic signals, using two sensors receiving at different water depths. The dashed line 1 shows the frequency response from a first sensor at one depth. The dashed line 2 shows the frequency response from a second sensor at another depth. The solid line 3 shows the combined resultant frequency response of the synthesized seismic record using the seismic signals from the two sensors.

Figure 3:
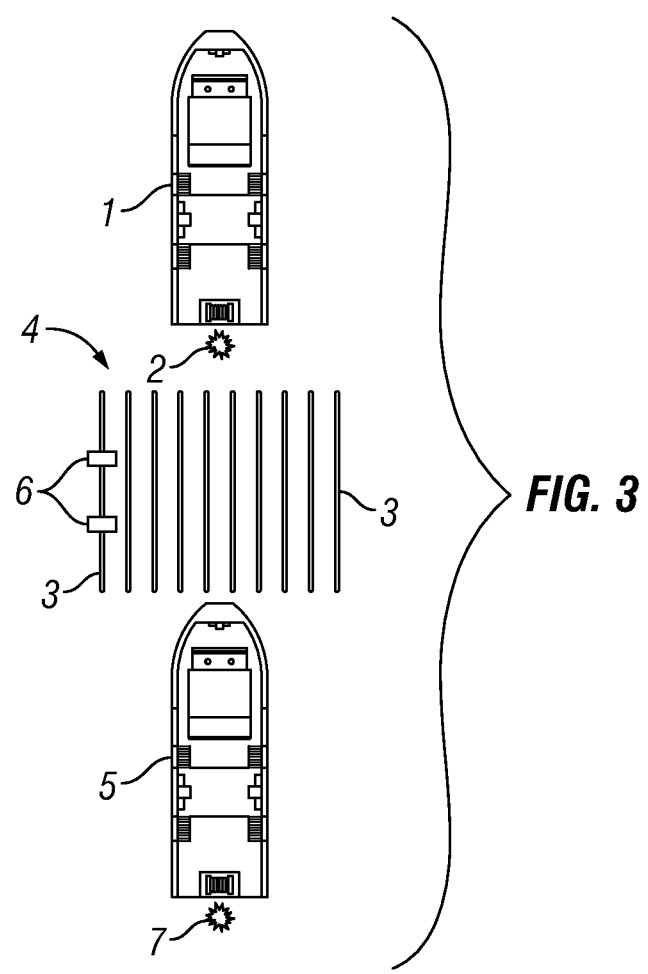
FIG. 3 shows schematically a top view of one example of a marine acquisition geometry, an acquisition geometry seen from above according to an example of the invention.

FIG. 3 shows schematically a top view of one example of a marine acquisition. A seismic vessel 1, acting as a first marine vessel, tows a seismic source 2 and a streamer array 4 that includes a plurality of streamers 3. A second source vessel 5, acting as an additional marine vessel, follows behind the tail of the streamer array 4. In this example, each streamer 3 is a non-uniformly horizontal streamer. The term "non-uniformly horizontal streamer" refers to a streamer where at least two portions of the streamer are at significantly different depths with respect to the sea surface.

A seismic source refers to a source that emits a seismic signal. Examples include an air gun, a marine vibrator, a water gun or any combination or number of these devices. In some examples, a seismic source comprises only one such device, but in other examples comprises several such devices that in this example are actuated substantially simultaneously. Furthermore, a marine vessel tows one or more such seismic sources that in the latter case are actuated at separate times. For the sake of simplicity, though, the term "seismic source" in its singular form shall refer in some examples to any number of seismic sources on any given marine vessel.

In one example, the two or more seismic sources are disposed at significant spaced apart locations. Herein, "significant spaced apart" shall mean that the distance between the centers of the seismic sources is such that, in the course of surveying, each seismic source emits at least one seismic signal such that the thus emitted seismic signals travel along one substantially the same ray path and are received by seismic sensors positioned at significantly different depths. Hence, in one example, the distance can amount to several kilometers.

In one example, streamers are towed substantially parallel to a survey line, as defined herein. In one example, one streamer is towed. In other examples, multiple streamers are towed, as shown in FIG. 2, improving the efficiency and speed of data acquisition. For the sake of simplicity, though, the term "streamer" in its singular form shall refer in some examples to any number of streamers.

Onto each streamer at least one seismic sensor is attached. The one or more seismic sensors that are attached to the streamers are further connected to a recording system(s) on the seismic vessel(s). In some examples, the seismic recording system includes or is connected to navigation equipment to enable precisely determining the position of the vessel(s) and the individual seismic sensor(s). In some examples, the seismic recording system includes a source controller which selectively controls actuation of the seismic sources towed by the two or more vessels.

Examples of a "non-uniformly horizontal streamer" include, but are not limited to: (1) a "step-wise horizontal streamer" where at least two portions of the streamer are horizontal and the at least two portions of the streamer are at significantly different depths with respect to the sea surface and each other; (2) a "slanted streamer" where the streamer is at an uniform angle, as far as operationally possible, with respect to the sea surface and where the streamer spreads across significantly different depths; and (3) a "curved streamer" where at least two portions of the streamer are at different angles with respect to the sea surface and where the streamer spreads across significantly different depths. In one example, the term "significantly different depths" refers to such a range of depths, as measured with respect to the sea surface, that the seismic signals, which are received by the seismic sensors attached to the streamer, show sufficient notch diversity to be able to be substantially de-ghosted, using the techniques described herein.

In one example, streamer 3 is preferably slanted such that it is positioned deeper below sea surface the greater the distance the streamer is from seismic vessel 1.

FIG. 4A shows schematically in a profile view the example of a marine acquisition of FIG. 3, as seen from the side. FIG. 4A shows the acquisition configuration in one position at a first time. A first seismic signal is emitted from a seismic source 2 that is towed by a first seismic vessel 1. A portion of the first seismic signal propagates downwards along a ray path 12 to a subsurface area beneath a particular common mid-point (CMP) location 20, reflects and travels upwards to a first seismic sensor, seismic sensor 6, attached to a streamer 3. The received seismic signal is recorded over time as a first seismic trace. In one example, seismic signal ray path 12 propagates downward through water bottom 10 to reflect off of a geological layer 11. Ray path 12 illustrates the first seismic signal propagating upward to be received by the first seismic sensor, seismic sensor 6. The first seismic signal received at the seismic sensor, seismic sensor 6, is recorded as a seismic trace. A second vessel 5 is behind first seismic vessel 1 and, in this example, is also behind streamer 3.

A common mid-point (CMP) gather is a collection of traces that share substantially the same point halfway between the source point, where the respective seismic signal has been emitted, and the sensor point, where the respective seismic signal has been recorded. Strictly speaking, if the depth of the sensor point differs from the depth of the source point, then, the definition holds for the projection of the sensor point along the ray path onto the depth of the source point. In any case, for practical purposes "common mid-point" shall be defined, as a person skilled in the art usually does, as any point within, for example, a small area commonly known as a bin or similar measure of tolerance.

For practical purposes, "substantially the same mid-point" or "a substantially common mid-point" means any point within, for example, a small area commonly known as a bin or similar measure of tolerance.

A common depth-point (CDP) gather is a collection of traces that have recorded seismic signals whose ray paths converge at and are reflected in a common point in depth, hence common depth-point (CDP), regardless of the ray paths taken, on the one side, between the source points, where the respective seismic signals have been emitted, and the common depth-point or, on the other side, between the common depth-point and the respective sensor points, where the respective seismic signals have been recorded. In any case, for practical purposes "common depth-point" shall be defined, as a person skilled in the art does, as any point within, for example, a small area commonly known as Fresnel zone or similar measure of tolerance.

Seismic signals recorded in traces collected in a common mid-point gather do not exactly share the same common depth-point, as defined above, in the presence of dipping interfaces or a dipping reflector or in the case of mode conversion, but the deviation is commonly neglected in "time processing" of pure-mode waves, as a person skilled in the art will know. A common mid-point gather shall, for practical purposes in many examples, be understood to substitute the theoretically correct common depth-point gather, as a person skilled in the art will readily understand.

FIG. 4B shows the acquisition configuration in a second position at a second time. First seismic vessel 1, along with streamer 3, is now moved further away from the previously described common mid-point. In this example, second source vessel 5 tows a second seismic source 7 to emit an additional seismic signal. A portion of additional seismic signal propagates downwards along ray path 13 to a subsurface area beneath having substantially the same common mid-point (CMP) location 20 as shown in FIG. 4A. The additional seismic signal reflects and travels upwards to an additional seismic sensor, seismic sensor 9, attached to a streamer 3. In one example, again, additional seismic signal ray path 13 propagates downward through water bottom 10 to reflect off of the geological layer 11. Ray path 13 illustrates the additional seismic signal propagating upward to be received by the additional seismic sensor, seismic sensor 9. The additional seismic signal received at the additional seismic sensor, seismic sensor 9, is recorded as an additional seismic trace. It takes time to position or otherwise translate the seismic vessels in order to receive and record two or more seismic traces having substantially the same common mid-point. Therefore, the first seismic signal and the additional seismic signals are received over time and are therefore recorded at different times.

Notice that both the first and the additional traces have substantially the same ray paths 12 and 13 in the subsurface, below the water bottom 10. The two received seismic signals have therefore encountered substantially the same subsurface geology and contain substantially the same information. However, these two seismic signals were received by a first seismic sensor 6 and an additional seismic sensor 9 of streamer 3, these two seismic sensors positioned at different sensor depths at the time of receiving their respective seismic signals. Therefore, their frequency notches are at different frequencies.

In one example, source vessel 5 is positioned at the same distance away from the tail of streamer 3 (for example, the tail being near seismic sensor 9 of streamer 3 as shown in FIG. 4B) as the distance from seismic source 2 to the front of streamer 3. In this example, the configuration maximizes the number of traces collectable having substantially the same ray path. In another example, a plurality of streamers 3 is used, forming a streamer array 4 (as shown in FIG. 3). In another example, the additional source vessel is positioned further back to increase the source-sensor offset.

In a seismic survey, as a person skilled in the art knows, a seismic signal is emitted from a seismic source and propagates downwards (notwithstanding surface multiples on the source side and internal multiples, etc) to the water bottom and further to a seismic interface, is reflected, propagates upwards (notwithstanding surface multiples on the receiver side and internal multiples, etc) from the seismic interface to the water bottom and further up, and is recorded by seismic sensors. Of particular interest are, in this context, seismic signals that propagate essentially through the same volume of solid earth, as physically definable by the Fresnel volume, but are recorded by seismic sensors placed at different sensor depths. The term "substantially the same ray path" is used to describe any ray path from a first spot (preferably a small area) on the water bottom downwards to a spot (preferably a small area) on a seismic interface and from the said spot on a seismic interface upwards to a second spot (preferably a small area) on the water bottom, wherein the small area on a seismic interface can be chosen to mean a conventional bin, or a Fresnel zone, or similarly geometrically or physically or otherwise defined area as known by a person skilled in the art. Most importantly, the ray paths from the respective seismic sources to said first small area on the water bottom and the ray paths from the said second small area on the water bottom to the respective seismic sensors are excluded from the above definition. For shallow targets, in one example, the small areas will in most cases be within a radius of a few meters, while it for deep targets normally will mean within a radius of a few tens of meters. The size of the Fresnel zones also vary with frequency, meaning that for high resolution seismic surveys the Fresnel zones can be small (less than radius of 1 m). In some examples, the use of interpolation techniques may extend these distances, as is known in the art. Determination of the Fresnel-Zone is described for example in the article by Monk, David J. Fresnel-zone binning: Fresnel-zone shape with offset and velocity function. Geophysics 2010 75: T9-14. The known difference in streamer depth will of course result in a variation in the two-way travel time within substantially the same ray path. In some examples, this difference is accounted for during processing.

In another example of the use of the term "substantially the same ray path", the term means the requirements for applying reciprocity are sufficiently well met such that reciprocity can be applied to convert a record of an additional seismic signal into a synthetic record that seems to have received another first seismic signal emitted by a first seismic source, or vice versa. Here, reciprocity includes for example, but not limited to, compensation for seismic source and seismic sensor directivity, spherical divergence, etc, whereby said processing steps can also be applied individually.

In another example, ray paths having at least partially overlapping Fresnel zones would define signals propagating along substantially the same ray path.

FIG. 5A shows schematically a profile view of another example of an acquisition geometry, as seen from the side. FIG. 5A shows the acquisition configuration in one position at a first time. A first seismic signal is emitted from a seismic source 2 that is towed by a first seismic vessel 1. A portion of the first seismic signal propagates downwards along a ray path 12 to a subsurface area beneath a particular common mid-point (CMP) location 20, reflects and travels upwards to a first seismic sensor, seismic sensor 6, attached to a streamer 3. The received seismic signal is recorded over time as a first seismic trace. In one example, seismic signal ray path 12 propagates downward through water bottom 10 to reflect off of a geological layer 11. The reflection point is denoted by an imaginary vertical line through the common mid-point position or CMP 20. Ray path 12 illustrates the first seismic signal propagating upward to be received by the first seismic sensor, seismic sensor 6. The first seismic signal received at the seismic sensor, seismic sensor 6, is recorded as a seismic trace. A second vessel 5 is behind first seismic vessel 1 and, in this example, is also behind streamer 3. In contrast to the example shown in FIGS. 4A and 4B, the location of second vessel 5, a shooting vessel, is disposed closer relative to the length of the streamer.

FIG. 5B shows the acquisition configuration in a second position at a second time. First seismic vessel 1, along with streamer 3, is now moved further away from the previously described common mid-point. In this example, second source vessel 5 tows a second seismic source 7 to emit an additional seismic signal. A portion of additional seismic signal propagates downwards along ray path 13 to a subsurface area beneath having substantially the same common mid-point (CMP) location 20 as shown in FIG. 5A. The additional seismic signal reflects and travels upwards to an additional seismic sensor, seismic sensor 9, attached to a streamer 3. In one example, again, additional seismic signal ray path 13 propagates downward through water bottom 10 to reflect off of the geological layer 11. Ray path 13 illustrates the additional seismic signal propagating upward to be received by the additional seismic sensor, seismic sensor 9. The additional seismic signal received at the additional seismic sensor, seismic sensor 9, is recorded as an additional seismic trace.

In this example, contrasted from the example shown in FIGS. 4A & 4B, the second source vessel 5 is advanced well ahead of the streamer tail position such that the additional signal path of the down going portion of ray path 13 below the water bottom 10 more closely matches the down going portion of ray path 12 from the first seismic signal. Likewise, the additional signal up-going portion of ray path 13 below the water bottom 10 more closely matches the up going portion of ray path 12 from the first seismic signal.

It takes time to position or otherwise translate the seismic vessels in order to receive and record two or more seismic traces having substantially the same common mid-point. Therefore, the first seismic signal and the additional seismic signals are received over time and are therefore recorded at different times.

Again, in this example, the first and the additional traces have substantially the same ray paths 12 and 13 in the subsurface, below the water bottom 10. The two received seismic signals have therefore encountered substantially the same subsurface geology and contain substantially the same information. However, these two seismic signals were received by a first seismic sensor 6 and an additional seismic sensor 9 of streamer 3, these two seismic sensors positioned at different sensor depths at the time of receiving their respective seismic signals. Therefore, their frequency notches are at different frequencies.

FIG. 6A shows schematically a profile view of another example of an acquisition geometry, as seen from the side. FIG. 6A shows the acquisition configuration in one position at a first time. In this example, source vessel 5 travels in front of seismic vessel 1. At the first time, source vessel 5 actuates its seismic source, seismic source 7. A portion of the seismic signal propagates along ray path 14, propagating downward through water bottom 10 to reflect off of geological layer 11. Ray path 14 illustrates the seismic signal propagating upward to be received by the seismic sensor, seismic sensors 6. The seismic signal received at the seismic sensor, seismic sensor 6, is recorded as a seismic trace.

FIG. 6B shows the acquisition configuration in a second position at a second time. At this later time, seismic vessel 1 actuates seismic source 2. A portion of the seismic signal propagates along ray path 15, propagating downward through water bottom 10 to reflect off of geological layer 11. Ray path 15 illustrates the seismic signal propagating upward to be received by the seismic sensor, seismic sensor 9. The seismic signal received at the seismic sensor, seismic sensor 9, is recorded as a seismic trace.

Notice that the two recordings have gone through essentially the same travel-path. Both the first and the additional traces have substantially the same ray paths 14 and 15 in the subsurface, below the water bottom 10.

In another example, seismic source 7 and seismic source 5 are positioned or otherwise deployed at different depths with respect to each other and with respect to the surface of the water. The received seismic signals and recorded traces will have substantially the same ray paths 14 and 15 in the subsurface, below the water bottom 10. However, the two seismic sources were at different depths, and the two travel ray paths are received or picked up by the seismic sensors that are at different sensor depths. Both the source and the receiver ghost notches will occur in different portions of the frequency spectrum.

In another example, more than one additional source vessel is deployed. Referring to FIG. 3 in an example of a multi-streamer configuration of a 3-D context, additional seismic sources are positioned or otherwise deployed. Referring to FIG. 7A, additional seismic sources are positioned or otherwise deployed in the cross-line direction In a further example, in a 3D context, additional seismic sources are deployed in the cross-line direction (on each side of the streamer array and/or in front/back of the streamer array). Such a cross-line geometry, as shown in FIGS. 7A & 7B and are used, in one example, to acquire multi-azimuth, wide-azimuth and/or rich-azimuth data.

FIG. 7A shows schematically a top view of another example of an acquisition geometry. FIG. 7A shows the 3D multi-vessel acquisition configuration in one position at a first time. In this example a streamer 53 is towed by a first marine vessel A, a first seismic source 55 is attached to an additional marine vessel C and an additional seismic source 57 is attached to another additional marine vessel B. During the course of surveying, at a certain first time, first seismic source 55 emits a seismic signal, of which a portion propagates along ray path 16, and is received by a first seismic sensor, seismic sensor 56, attached to streamer 53. The received signal is recorded as a seismic trace. A midway location between first seismic source 55 and the first seismic sensor, seismic sensor 56 is defined as a common mid-point CMP, having a projected x & y location in a plan or overhead view. In one example, a seismic source 52 is deployed from first marine vessel A.

Figure 7B:
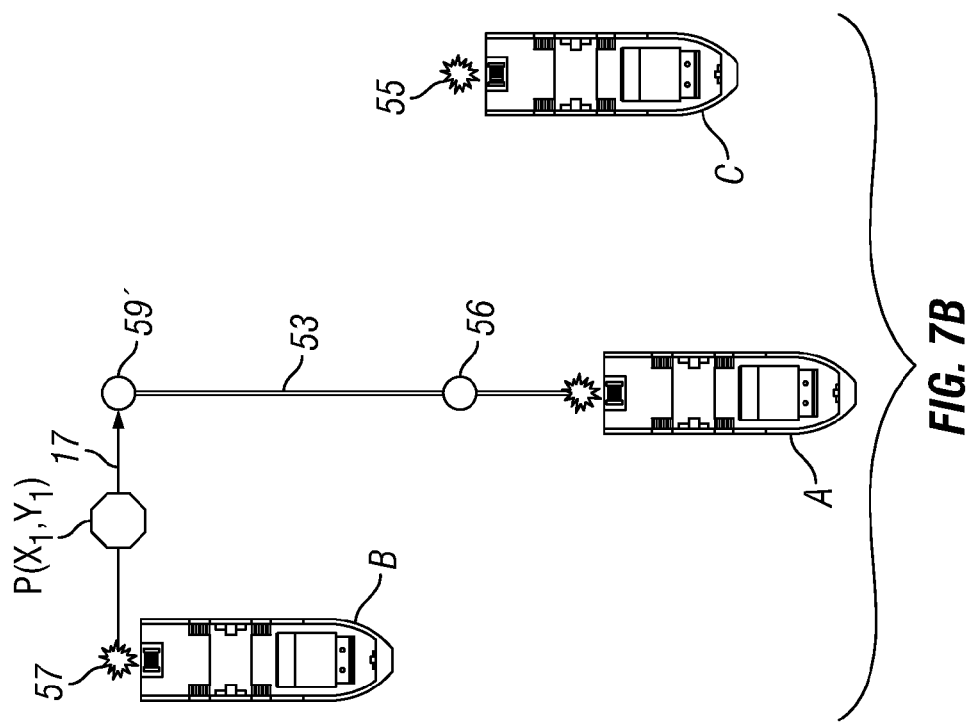
FIGS. 7A and 7B show schematically a top view of another example of a marine acquisition geometry, in a 3D multi-vessel acquisition configuration.
Figure 7A:
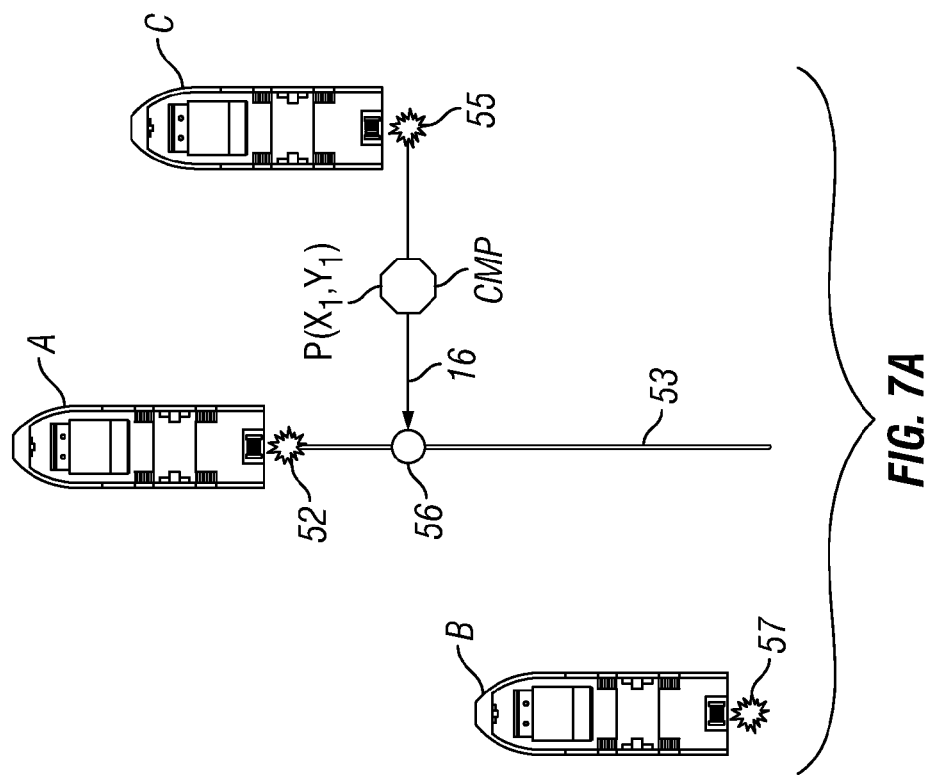

FIG. 7B shows the 3D multi-vessel acquisition configuration in a second position at a second time. In one example, marine vessels A, B, and C turn around. Additional seismic source 57 attached to marine vessel B emits an additional seismic signal, of which a portion propagates along ray path 17, and is received by an additional seismic sensor, seismic sensor 59, attached to streamer 53. The received signal is recorded as an additional seismic trace. Both records of the first and the additional seismic signal have the same CMP, and thus the seismic signals travel substantially along the same ray path through the solid earth, but are received by different seismic sensors being arranged at different sensor depths. In one example, CDP's are used in place of CMP's. Since said streamer is towed with a non uniform depth, the traces recorded will have their ghost notches at different frequencies.

In an "opposite-direction" configuration (as illustrated in, for example, FIG. 4), in one example, seismic signals emitted or otherwise generated by a first and an additional seismic source travel along a substantially the same ray path, according to the definition above, but do so in opposite directions. Nonetheless, as explained above, any record of a, here, additional seismic signal can be converted into a synthetic record of another first seismic signal generated by a first seismic source. Either way, records are acquired or constructed, as the case may be, of seismic signals either having substantially the same common mid-point (CMP) or illuminating substantially the same common depth-point (CDP), both at substantially the same offset in substantially the same way, as a person skilled in the art will readily apprehend. Therefore, those substantially same records can be collected in a CMPO or CDPO gather, respectively, and de-ghosted by any method and system described herein, thus creating a single synthetic, but substantially de-ghosted record of the super-ordinate CMP or CDP gather, respectively.

Figure 8B:
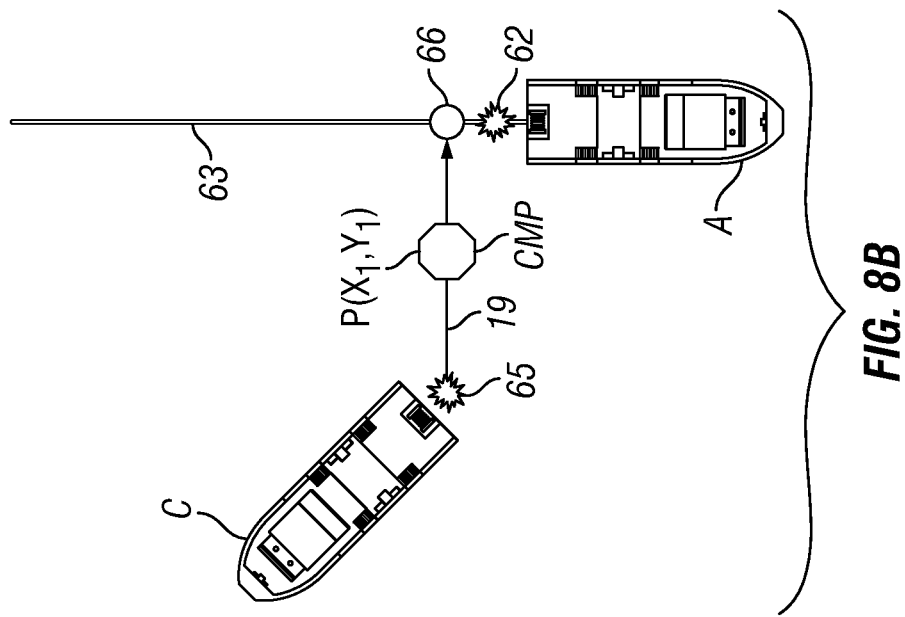
FIGS. 8A and 8B show schematically a top view of another example of a marine acquisition geometry, in a 3D multi-vessel angled acquisition configuration.
Figure 8A:
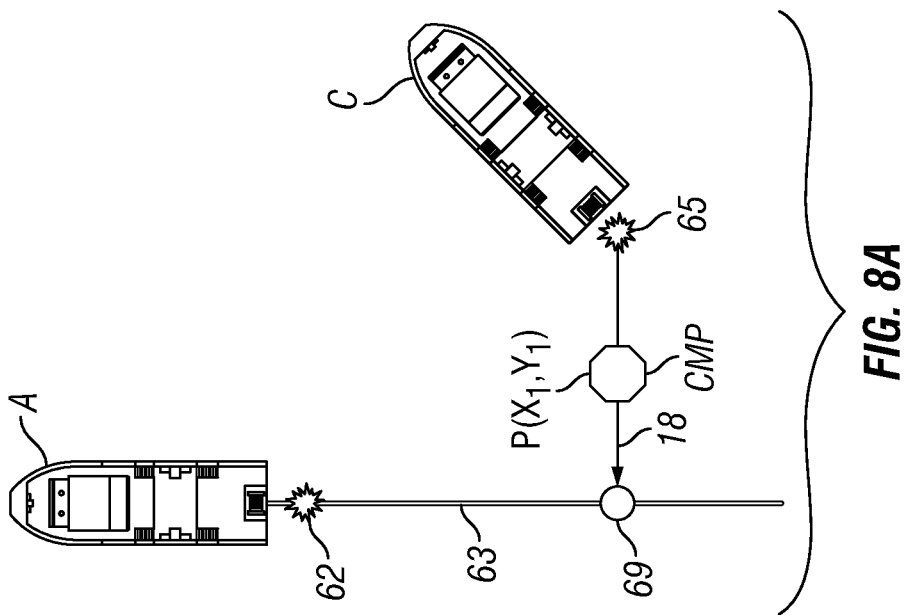

FIG. 8A shows schematically a top view of another example of an acquisition geometry, in a 3D multi-vessel angled acquisition configuration. FIG. 8A shows the acquisition configuration in one position at a first time. An additional marine vessel C translates at an angle from the survey line (the path of streamer 63 as it is towed by marine vessel A) towing a seismic source 65. During the course of surveying, at a certain first time, seismic source 65 emits a seismic signal, of which a portion propagates along ray path 18, and is received by a first seismic sensor, seismic sensors 69, attached to streamer 63. The received signal is recorded as a seismic trace. The midway location between first seismic source 65 and the first seismic sensor, seismic sensor 69 is defined as a common mid-point (CMP), having a projected x & y location in a plan or overhead view. In one example, a seismic source 62 is deployed from first marine vessel A.

FIG. 8B shows the acquisition configuration in a second position at a second time. Marine vessel A, towing streamer 63, returns to the proximity of the CMP. Marine vessel C, also in proximity of the CMP, emits an additional seismic signal from seismic source 65. A portion of the emitted additional seismic signal propagates along ray path 19, and is received by an additional seismic sensor, seismic sensor 66, attached to streamer 63. The additional received signal is recorded as an additional seismic trace. Both records of the first and the additional seismic signal have the same common mid-point (CMP) or CDP, and thus the seismic signals travel substantially along the same ray path through the solid earth, but are received by different seismic sensors being arranged at different sensor depths. In one example, CDP's are used in place of CMP's. Since said streamer is towed with a non-uniform depth, the traces recorded will have their ghost notches at different frequencies.

As can be appreciated by a person skilled in the art, the first and the additional seismic signals (sharing a substantially common mid-point) are two of a collection of seismic signals received and recorded by the plurality of seismic sensors and the plurality of emitted seismic signals from a plurality of source locations. In many examples, many intervening seismic signals, those signals associated with other CMP's, are received and may be recorded. Over time, however, a plurality of seismic signals associated with substantially the same CMP will be received and recorded. By also collecting information on the locations of the seismic sources and the seismic sensors for these recorded seismic signals, it is possible to associate the recorded traces of the seismic signals that share a substantially common mid-point. Further, it is possible to associate those recorded traces of the seismic signals that share a substantially common mid-point and share substantially the same source-sensor offset. In this way, multiple traces exist that have different ghost arrival times but, having substantially the same offset, do not need to have a normal move-out correction applied. These traces having both common mid-point (CMP) and common source-sensor offset are referred to herein as CDPO traces (common depth-point and common offset) or CMPO traces (common mid-point and common offset), as the case may be.

From a CDPO or CMPO gather containing at least two traces whose respective sensor points differ in depth such that the respective receiver ghosts differ, processing can construct one or more synthetic traces in which the effect of the original receiver ghost is substantially reduced or removed.

A common depth-point-and-offset (CDPO) gather is, therefore, a collection of traces from a common depth-point (CDP) gather with the same offset. For practical purposes as, in one example, seismic processing, a common mid-point gather is substituted for a common depth-point gather, as explained above. "Offset", in turn, is the horizontal distance between the shot point, where a seismic signal is emitted, and the sensor point, where that seismic signal is recorded. Strictly speaking, if the depth of the sensor point differs from the depth of the source point, then, the definition holds for the horizontal distance between the source point and the projection of the sensor point along the ray path onto the depth of the source point. In any case, for practical purposes as, in one example, the processing of seismic data "offset" is defined as any offset within some specified upper and lower limit of the horizontal distance or tolerance. In some examples, the offset is corrected for the depth differences between the source point and the sensor point.

Normal move-out correction requires an interpretation of the acoustic travel velocity of the media encountered along the ray path of the seismic signal. This normal move-out correction interpretation is influenced by various 2D and 3D effects, such as AVO, multiples, dipping beds, curved-ray, anisotropy. Normal move-out correction interpretation can be subjective. Applying a normal move-out correction for purposes of de-ghosting complicates certain pre-stack processing techniques, for example, where pre-stack migration is desired. Making available CDPO (or CMPO) traces for de-ghosting enables de-ghosting processing without having to make a normal move-out correction interpretation.

Turning to further examples of acquisition, a number of source vessels travel more or less at random within the survey area and actuate their seismic sources. Over time, this will result in a number of signals having substantially the same ray path, all over the survey.

In another example, to ensure adequate subsurface coverage, and obtain "substantially the same ray path", the timing of the firings of the multiple seismic sources are altered.

In one example, the first and additional seismic sources are actuated independently. In one example, the independent actuation or firing is preformed at regular intervals. In one example, the independent actuation or firing is preformed at irregular intervals. In one example, the independent actuation or firing is preformed at random intervals. In one example, the independent actuation or firing is preformed at pseudo-random intervals.

In one example, two or more of the seismic sources are actuated or otherwise actuated sequentially. In one example, the sequential actuation or firing is preformed at regular intervals. In one example, the sequential actuation or firing is preformed at irregular intervals. In one example, the sequential actuation or firing is preformed at random intervals. In one example, the sequential actuation or firing is preformed at pseudo-random intervals.

In one example, two or more of the seismic sources are actuated simultaneously. In one example, the simultaneous actuation or firing is preformed at irregular intervals. In one example, the simultaneous actuation or firing is preformed at random intervals. In one example, the simultaneous actuation or firing is preformed at pseudo-random intervals.

In another example, the seismic sources are actuated in blended sequence. In one example, blending is defined here that more than one seismic source is actuated within the shot-point interval of the survey.

In another example, seismic source are actuated randomly. In one example, seismic sources are actuated randomly to improve the data quality after interpolation and regularization.

In a further example, a geologic criteria is used to ensure obtaining an adequate number of signals originating from different seismic sources, having substantially the same ray path (below water bottom).

In one example, at least one streamer is translated by the first marine vessel.

In another example, at least one additional streamer is translated by one or more of the additional marine vessel(s).

In another example, the first or additional seismic sources are translated along a survey line.

In another example, the additional seismic source is translated ahead or behind the first seismic source along the survey line.

In another example, the first or additional seismic source is translated parallel and offset to the survey line.

In another example, the additional seismic source is translated ahead or behind the first seismic source parallel and offset to the survey line.

In another example, the first or additional seismic sources are translated at an angle to the survey line.

Recall, as a person skilled in the art will readily be able to apprehend, in one example, performing an acquisition such that "substantially the same ray path" is replicated multiple times using a first seismic source, an additional seismic source, a first seismic sensor and an additional seismic sensor, or a single first and additional seismic sensor, that is substantially in line with each other. Either way, records are acquired or constructed in the same-direction or opposite-direction configuration, as the case may be, of seismic signals having the same CMP/illuminating the same CDP in substantially the same way, as a person skilled in the art will readily apprehend. Furthermore, said records having the same CMP/illuminating the same CDP show substantially the same offset; to be precise, if the ray paths were virtually extended to the surface on both the source and receiver sides, the respective distance between the thus defined cross-points is essentially the same one, with any deviation being so small as to be negligible. Thus, they populate a CMPO/CDPO-gather, as defined above, and can be de-ghosted by any method and system described herein, thus creating a synthetic and substantially de-ghosted trace in the super-ordinate CMP/CDP gather.

To be true, a CMPO/CDPO gather, as defined above, is ideal with respect to replication or applicability of reciprocity. However, in some examples, the requirement of seismic signals having travelled substantially the same ray path can be relaxed such as to include seismic signals having travelled at an oblique angle in substantially the same- or opposite-direction configuration.

Figure 9:
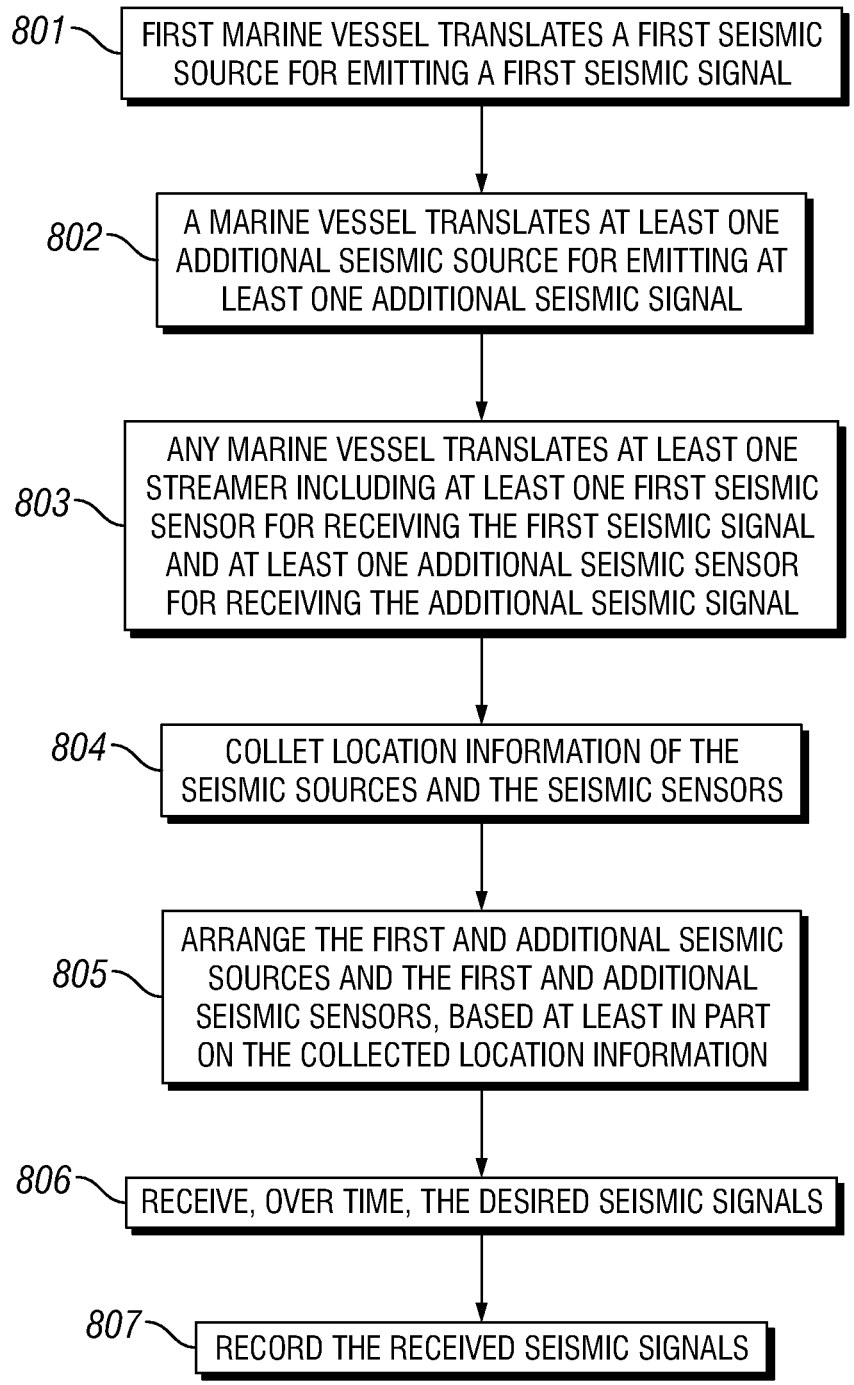
FIG. 9 shows a flowchart view of a method for acquiring the marine seismic data, according to an example of the invention.

FIG. 9 shows a flowchart view of a method for acquiring the marine seismic data, according to an example of the invention. In one example, the marine seismic data is acquired in such a way that at least a part of the mentioned acquired data can be partially or fully "de-ghosted on the receiver side" and then partially or fully re-assembled to a pre-stack dataset. A first marine vessel translates a first seismic source for emitting a first seismic signal, step 801. In one example, a seismic source is one or more air guns. In one example, the first marine vessel tows at least one non-uniformly horizontal streamer. The first marine vessel, or at least one additional marine vessel, translates at least one additional seismic source for emitting at least one additional seismic signal, step 802. In one example, at least two seismic sources are positioned and arranged to emit seismic signals at spaced apart positions. Any marine vessel also translates at least one streamer including at least one first seismic sensor for receiving the first seismic signal and at least one additional seismic sensor for receiving the additional seismic signal, step 803. In one example, the marine vessel translates or otherwise proceeds along a thus to be defined survey line. In one example, the first and additional seismic sensors are arranged at different sensor depths for the eventual purpose of removing the frequency suppression in the seismic signals due to ghosting. Such an acquisition geometry enables recording the seismic signals that illuminate a common depth-point (CDP) at a substantially equal offset on both a shallow part and a deep part of said towed streamer. Information is collected on the locations of the seismic sources and the seismic sensors, step 804. In one example, shot point and sensor point location information, representative of "x" and "y" and depth, is measured, estimated, and/or calculated and stored in their respective seismic trace headers. Based at least in part on the collected location information, the first and additional seismic sources and the first and additional seismic sensors are arranged, step 805. In one example, the course of one or more of the marine vessels is altered for the purpose of positioning the streamer and/or seismic sources. In one example, the depths of the seismic sensors are arranged by altering the depths along the streamer. In this way, through repeated emission of seismic signals as the sources and receiving seismic sensors are translated or otherwise moved along a survey, over time, multiple recordings of a first seismic signal and an additional seismic signal will be collected that have propagated substantially along the same ray path below the water bottom and through the geologic layers. Therefore, over time, pairs can be collected of: 1) a first seismic signal emitted by a first seismic source (and received by a first seismic sensor) and 2) an additional seismic signal emitted by an additional seismic source (and received by an additional seismic sensor). In this manner, the source-sensor offset of the emitting first seismic source and the receiving first seismic sensor is substantially the same as the source-sensor offset of the emitting additional seismic source and the receiving additional seismic sensor. Additionally, in this manner, the common mid-point of the emitting first seismic source and the receiving first seismic sensor is substantially the same as the common mid-point of the emitting additional seismic source and the receiving additional seismic sensor. Additionally, in this manner, the receiving first seismic sensor and the receiving additional seismic sensor are at different sensor depths. Therefore, over time the desired seismic signals are received, step 806. These seismic signals are recorded, step 807. In one example, the received seismic signals are associated with relevant location information of the seismic source and seismic sensor associated with the received seismic signal, as well as seismic source and seismic sensor depth information, and the information recorded in association with the recording of the received seismic signal. In one example, this associated information is recorded with the received seismic signal to create a recorded seismic trace with trace header containing the additional information. In one example, a substantially de-ghosted seismic signal in the pre-stack domain is constructed from the first seismic signal and the additional seismic signal.

Figure 10:
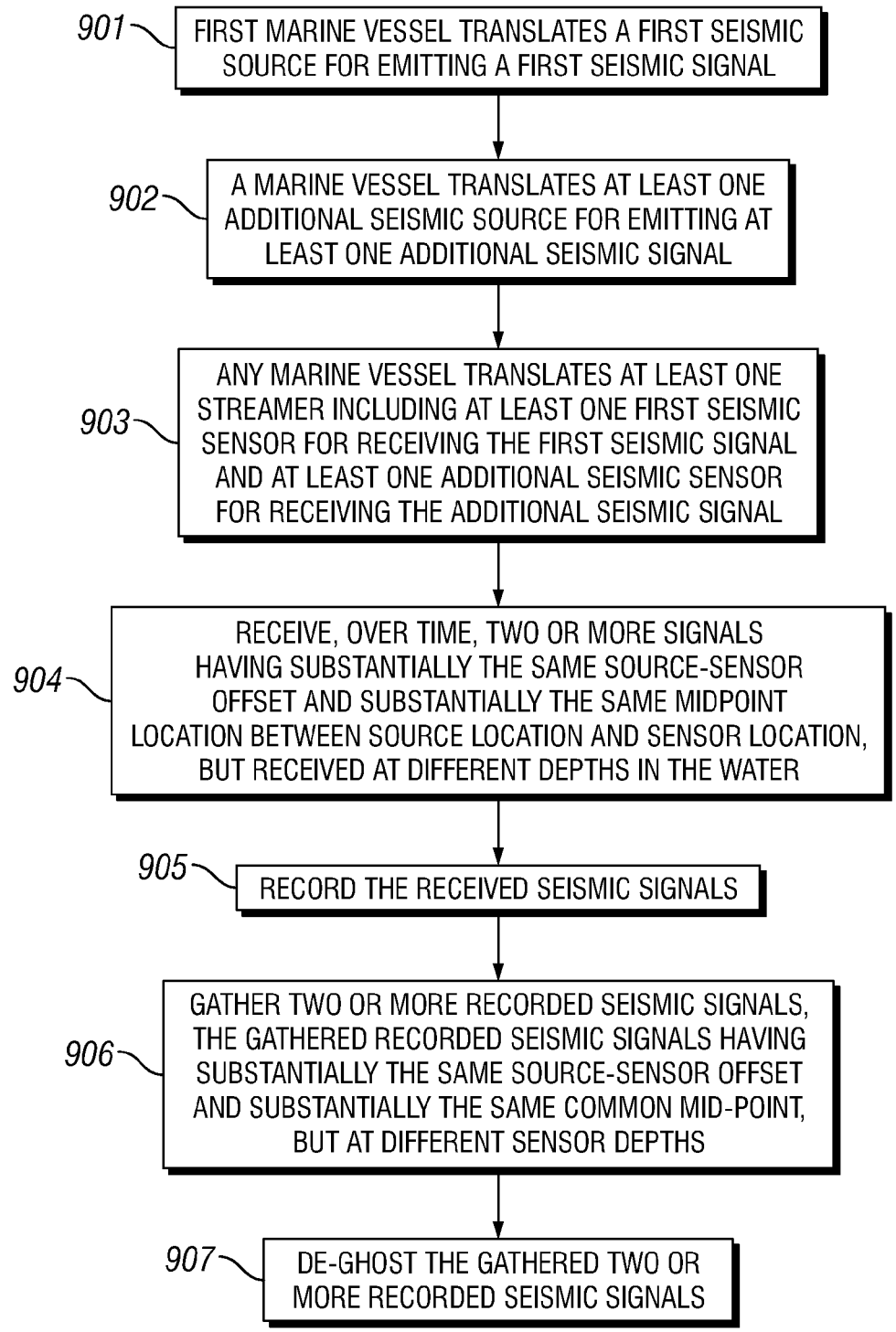
FIG. 10 shows a flowchart view of a method for acquiring and de-ghosting marine seismic data, according to an example of the invention.

FIG. 10 shows a flowchart view of a method for acquiring de-ghosted marine seismic data, according to an example of the invention. A first marine vessel translates a first seismic source for emitting a first seismic signal, step 901. In one example, a seismic source is one or more air guns. In one example, the first marine vessel tows at least one non-uniformly horizontal streamer. The first marine vessel, or at least one additional marine vessel, translates at least one additional seismic source for emitting at least one additional seismic signal, step 902. In one example, at least two seismic sources are positioned and arranged to emit seismic signals at spaced apart positions. Any marine vessel also translates at least one streamer including at least one first seismic sensor for receiving the first seismic signal and at least one additional seismic sensor for receiving the additional seismic signal, step 903. In one example, the marine vessel translates or otherwise proceeds along a thus to be defined survey line. In one example, the first and additional seismic sensors are arranged at different sensor depths for the eventual purpose of removing frequency suppression in the seismic signals due to ghosting. Such an acquisition geometry enables recording the seismic signals that illuminate a common depth-point (CDP) at a substantially equal offset on both a shallow part and a deep part of said towed streamer. Over time, two or more signals are received which will have substantially the same source-sensor offset and substantially the same mid-point between source location and sensor location, but be received at different sensor depths in the water, step 904. In one example, through repeated emission of seismic signals as the seismic sources and receiving seismic sensors are translated or otherwise moved along a survey, over time, multiple recordings of a first seismic signal and an additional seismic signal will be collected that have propagated substantially along the same ray path below the water bottom and through the geologic layers. Therefore, over time, two or more (in one example, pairs) are collected of: 1) a first seismic signal emitted by a first seismic source that is received by a first seismic sensor and 2) an additional seismic signal emitted by an additional seismic source that is received by an additional seismic sensor. In this manner, the offset between the seismic source and the seismic sensor of the emitting first seismic source and the receiving first seismic sensor is substantially the same as the offset between the seismic source and the seismic sensor of the emitting additional seismic source and the receiving additional seismic sensor. Additionally, in this manner, the common mid-point of the emitting first seismic source and the receiving first seismic sensor is substantially the same as the common mid-point of the emitting additional seismic source and the receiving additional seismic sensor.

Additionally, in this manner, the receiving first seismic sensor and the receiving additional seismic sensor are at different sensor depths. The received seismic signals are recorded, step 905. In one example, the received seismic signals are recorded in computer memory and made available for further processing. Examples of recording include, but are not limited to, writing to dedicated memory locations, writing to RAM memory, writing to a hard disk, writing to a structured data base, recording as a seismic trace with header information, recording with header information that includes location data. Two or more recorded seismic signals are gathered, the gathered recorded seismic signals having substantially the same source-sensor offset and substantially the same common mid-point, but at significantly different sensor depths, step 906. A significantly different sensor depth, for example, is where the sensor depths are at least different enough to enable identification of seismic signals originating from ghosting. In one example, the gathering process is executed by reading the trace headers that are associated with the recorded seismic traces that represent the received and recorded seismic signals. Those recorded seismic traces sharing substantially the same source-sensor offset and substantially the same common mid-point, but recorded at significantly different sensor depths are identified by a computing program as belonging to a common gather and are, therefore, considered to be "gathered". In a further example, the recorded seismic signals from step 905 are not preserved beyond the gathering step. The gathered two or more recorded seismic signals undergo a de-ghosting process, step 907. In one example, the de-ghosting operation constructs a substantially de-ghosted seismic signal in the pre-stack domain from the first seismic signal and the additional seismic signal. In one example, the gathered recorded seismic signals are de-ghosted to form or otherwise create a new synthesized seismic record that is a substantially de-ghosted seismic signal from the gather of recorded seismic signals.

In one example, source-sensor offset distances are considered to be substantially the same using a pre-defined tolerance that is based upon survey objectives. In one example, source-sensor offset distances are considered to be substantially the same using a pre-defined tolerance that is based upon Fresnel zone estimations based on the depth of the target objective or the seismic source or seismic sensor spacing geometry.

In one example, common mid-points are considered to be substantially the same using a pre-defined tolerance that is based upon survey objectives. In one example, common mid-points are considered to be substantially the same using a pre-defined tolerance that is based upon Fresnel zone estimations based on the depth of the target objective or the seismic source or seismic sensor spacing geometry.

Figure 11:
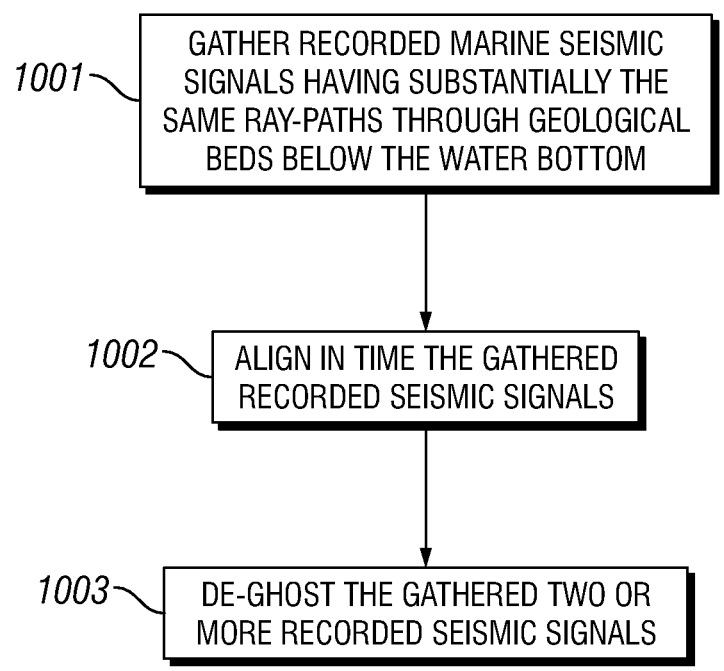
FIG. 11 shows a flowchart view of a method for processing marine seismic data to remove ghosts, according to an example of the invention.

FIG. 11 shows a flowchart view of a method for processing marine seismic data to remove ghosts, according to an example of the invention. Recorded marine seismic signals are gathered having substantially the same ray-paths through geological beds below the water bottom, step 1001. In one example, recorded marine seismic signals are gathered having substantially the same source-sensor offset and substantially the same mid-point where at least two of the gathered recorded marine seismic signals are acquired using different sensor depths. In one example, the gathering step is performed by a computing device operating on recorded seismic traces. In one example, the gathering process is executed by reading the trace headers that are associated with the recorded seismic traces that represent the received and recorded seismic signals. Those recorded seismic traces sharing substantially the same source-sensor offset and substantially the same mid-point, but recorded at significantly different sensor depths are identified by a computing program as belonging to a common gather and are, therefore, considered to be "gathered". In one example, the gathered recorded seismic signals are aligned in time, step 1002. In one example, the alignment in time is to a direct arrival from a common, known reflection. In one example, the alignment in time is to a ghost arrival from a common, known reflection. The gathered two or more recorded seismic signals undergo a de-ghosting process, step 1003. In one example, de-ghosting the gathered two or more recorded seismic signals creates a synthesized record with a substantially de-ghosted seismic signal. In one example, the de-ghosting step is applied prior to re-gathering the recorded seismic signals for further processing. In one example, it is noted that the gathering step is independent of a gathering step which may be used to gather recorded seismic traces.

In one example, the seismic signals having substantially the same source-sensor offset and substantially the same mid-point are gathered and de-ghosted prior to recording as a seismic trace.

In one example, the method for de-ghosting includes the step of brute stacking the gathered seismic signals.

In another example, the method for de-ghosting includes pre-stack de-convolution and stacking.

In another example, the method for de-ghosting includes matched filtering, pre-stack de-convolution, and stacking.

In another example, the method for de-ghosting includes inversion. In one example, the content of the true signal is estimated from the recorded seismic signal and the content of the ghost signal is estimated from the recorded seismic signal. In one example, this is performed by setting up and solving a system of equations.

In another example, a record of a first or an additional signal is transformed by means of applying reciprocity into a record that would have been obtained if the source and sensor location of said record were interchanged. Here, reciprocity means the physical property phrased as Betti's reciprocity theorem in, for example, pages 25-26 of "Quantitative Seismology Theory and Methods", Freeman and Co, 1980 by Aki and Richards and other text books known to a person skilled in the arts.

Reciprocity is a physical property between two elastodynamic states of forces and displacements, as expressed in Betti's theorem: the work done by a first set of forces through the displacements produced by a second set of forces equals the work done by the second set of forces through the displacements produced by the first set of forces (see, for example, Aki & Richards, Quantitative Seismology Theory and Methods, 1980, pages 25-27). Specifically in an acoustic (e.g., marine) medium with constant parameters as, for example, density said Betti's theorem, which in this case is also known as Rayleigh's theorem (see Rayleigh, Theory of Sound, 1878), simplifies: for a given frequency, viz. in the frequency domain, $$\iiint_V dV p_A q_B - v_{i,A} f_{i,B} - q_A p_B + f_{i,A} v_{i,B} =$$
$$\oiint_S dS [p_A v_{i,B} + v_{i,A} p_B] n_i, \quad (1)$$

where p denotes acoustic pressure, $v_i$ the particle velocity, $f_i$ the external volume force density, and $q_i$ the volume injection rate density, and where A and B define said two independent acoustic states (see, for example, Wapenaar & Fokkema, Green's function representations for seismic interferometry, Geophysics, 2006, volume 71, number 4, pages SI33-46).

For use in seismic processing, however, said Betti's theorem, or Rayleigh's theorem, are usually recast into Green's functions, functions that describe a wavefield quantity as, for example, pressure in point $x_B$ due to, for example, an impulsive explosion source (or source of volume injection rate, as defined by Wapenaar & Fokkema above) in point $x_A$. The Green's function for a change in pressure emitted in a first point by an impulsive seismic source and received in a second point by a seismic sensor equals the Green's function for the change in pressure emitted in the second point by an impulsive seismic source and received in the first point by a seismic sensor: for a given frequency, viz. in the frequency domain, $$G(x_S, x_R; f) = G(x_R, x_S; f) \qquad (2)$$

where G is the Green's function, $x_S$ and $x_R$ are the source and sensor points, respectively, and f is the frequency (see, for example, Wapenaar & Fokkema, Green's function representations for seismic interferometry, Geophysics, 2006, volume 71, number 4, pages SI33-46). For a person skilled in the art, said theorem is well known as the source-receiver reciprocity of the acoustic Green's function. It is also well known to be valid in an idealized acoustic (e.g., marine) environment only where an impulsive seismic source emits and a seismic sensor receives changes in pressure in an omni-directional way. However, as a person skilled in the art will also readily recognize, any deviation thereof by a physically realizable seismic source or seismic sensor can easily be compensated for. Likewise, Green's functions describing other seismic sources or other wavefield quantities as, for example, particle velocity received by, for example, a geophone or dissimilar states as, for example, different densities or sound velocities at the two points can be derived.

Betti's theorem, or Rayleigh's theorem, allows reconstruction from an observed wavefield emitted by a seismic source in a first point and received by a seismic sensor in a second point another unknown wavefield that would have been observed if it were emitted by a seismic source in the second point and received by a seismic sensor in the first point.

In another example, the method for de-ghosting includes gathering a plurality of synthesized records having a substantially common mid-point.

In an example of an acquisition system and method, a seismic vessel tows a six (6) kilometer long streamer with a slant along a predetermined survey line. In one example, the acquisition system is deployed as shown in FIGS. 4A & 4B. In one example, the front of the streamer is kept at a depth of around five (5) meters, while the tail end is at around thirty (30) meters. In one example, an extra source vessel follows close to the tail of the streamer. In one example, both the seismic vessel and the source vessel actuate their seismic source(s) at a given interval (typically every twenty-five (25) meters, to sample the subsurface. In one example, this is done in an overlapping (blended) fashion; in another example, in a non-overlapping fashion. In a blended acquisition example, the data is de-blended to separate the two wavefields. In one example, the acquisition produces a dataset of recorded seismic signals, or seismic traces, where many CMP's or bins contain traces that have travelled through essentially the same subsurface geology, but have been recorded on parts of the streamer that were at different depths. In one example, these traces are made to form pairs or groups that have their receiver notches at different, but known frequencies. By combining the pairs/groups it is possible to effectively eliminate or, at least, attenuate the receiver ghost.

In one example, two processing steps are used to obtain the ghost free dataset described above. In one example, a computer program algorithm is used that makes it possible to identify CMP's with a similar offset. In one example, a search algorithm is used. In another example, in a 3-D context, the traces are first binned, and then traces are identified within a bin that have similar offset. In another example, in a 3-D context, the traces are first binned, and then traces are identified within a Fresnel zone that have similar offset. In another example, in a 3-D context, the traces are first binned, and then traces are identified within a bin or a Fresnel zone that have similar offset. Once this has been done, each pair or group of similar traces is combined. In one example, the group of similar traces is combined by adding the traces in the group together. In one example, the addition is done in the frequency domain, for example, where it is straightforward to extend the addition with frequency-dependent weights that account for the position of the ghost notches. In one example, the result is a ghost-free, pre-stack seismic dataset.

In one example, offsets or sensor depths are checked—in one example, especially in the mid-offset range—for problems in identifying traces with sufficient notch diversity. In one example, a more elaborate search is performed where some variation from the substantially same travel-path of the traces criteria is allowed in the traces that are grouped and combined. In one example, in a 3-D acquisition setting, a better trace-pair matching is obtained by allowing some slant variations between the slant of neighboring streamers at the mid-offsets.

A system for practicing the invention is contemplated where a seismic survey in a marine environment is typically performed by two vessels, i.e. by a seismic vessel towing a seismic source, which can be a single or, more often, flip-flop seismic source, and a number of streamers containing seismic sensors as well as a source vessel towing another seismic source. The seismic sources fire at regular or, nowadays also, irregular, e.g. random or pseudo-random, time intervals; said time intervals are typically larger than the record time of any one trace, as defined below, but, nowadays also, can overlap in "blended" data acquisition.

The thus emitted seismic energy travels along so-called ray paths through the earth, is reflected at interfaces between layers of different elastic properties creating a seismic event, travels further, and is received by one or multiple seismic sensors. Over time, a so-called trace with seismic events, one per seismic sensor and per firing of a seismic source, is collected by seismic sensors on streamers and recorded by seismic recording devices.

Further contemplated is a computer system configured and programmed for seismic processing. In the course of seismic processing, records are firstly sorted according to their common mid-points; that is, records having substantially the same common mid-point, as defined above, are sorted into the same common mid-point (CMP) gather, as defined above, or, if a sufficiently good velocity model is available, into the same common depth-point (CDP) gather. Within the at least one common mid-point or common depth-point gather, records are secondly sorted according to their source-sensor offset; that is, records having substantially the same source-sensor offset, as defined above, are sorted into the same common mid-point common offset gather or, as the case may be, the same common depth-point common offset gather. Each such common mid-point common offset (CMPO) gather or common mid-point common depth-point (CDPO) gather contains ideally at least two records, where the receiving seismic sensors have been located at different sensor depths and, thus, have experienced the ghost at different notch frequencies—thus, the gathered at least two records show notch diversity. Further contemplated is a computer system configured and programmed with programming code to execute the steps for gathering the common mid-point common offset gathers.

As a person skilled in the art knows, survey designs currently in use typically define "bin" as a small area, with the bin size being equal to the distance between two adjacent midpoints and the bin centre being centered beneath a mid-point;

however, bins the size of multiples or fractions of such small areas can also be defined. Although depending on the distance between successive firings of a seismic source and the distance between adjacent seismic sensors, typically, surveys are designed such that at least one ray is emitted by a seismic source, reflected underneath said bin, and received by a seismic sensor; in the course of translating the seismic source along the survey line, such rays are reflected underneath said bin multiple times—the so-called "fold"—with increasing source-sensor offset until they are no longer receivable within the length of the streamer used. In one example, both the front and the back vessel operate a seismic source, which itself can, for example, be a single or a flip-flop seismic source for each vessel such that a said bin is, over time, covered by reflecting rays emitted from a seismic source of the front vessel and by rays emitted from a seismic source of the back vessel. In another example, one or more additional seismic vessel translate seismic sources parallel and offset and/or at an angle to the survey line in front of and/or behind the first seismic vessel such that a said bin is, over time, covered by reflecting rays emitted from a seismic source of the first seismic vessel and by rays emitted from a seismic source of any additional seismic vessel. In any case, examples of the invention envision deploying at least two seismic sources, each of which can itself be a single or flip-flop or otherwise configured seismic source, such that a said bin is, over time, covered by reflecting rays emitted from at least two such seismic sources. In another case, examples of the invention envision deploying the two or more components of a flip-flop seismic source spaced apart such that a said bin is, over time, covered by reflecting rays emitted from at least two such components of a seismic source and received at significantly different sensor depths.

However, as a person skilled in the art knows well, any survey design is "nominal" only, and, in practice, the layout of seismic sources and seismic sensors deviate from the survey plan due to feathering of streamers, positioning inaccuracies of the vessels, seismic sources or streamers, or for other reasons. In this case, there might not be at least two rays in said (common mid-point or common depth-point) bin with substantially the same source-sensor offset, and that requirement must be relaxed. In fact, having substantially the same source-sensor offset is not strictly required, but desirable as the rays having passed through the same part of the earth experience the same sound velocity, attenuation, geometric spreading, etc, thus making the two records as similar as possible.

For the same reason, a 2D configuration, wherein in said CMPO or CDPO gather the first and additional seismic sources having emitted said rays and the seismic sensors having received said rays are in line, is desirable. However, at the discretion of the seismic processor, that requirement may also be relaxed to include the 3D configuration arising from deploying multiple streamers.

In either case, any differential moveout of an event recorded in the traces of said CMPO or CDPO gather can be compensated, and preferably so as to match the moveout of the event in the trace from the first seismic source.

Finally, the traces in said CMPO or CDPO gather can be combined, or stacked, to construct a single trace wherein any ghost is substantially reduced. Further contemplated is a computer system configured and programmed with programming code to execute the steps for constructing the single traces wherein any ghost is substantially reduced. Herein, the stacking can be done in different ways: in one example, the traces are brute stacked; in another example, the traces are de-convolved and stacked; in another example, the traces are matched filtered, de-convolved and stacked (see Posthumus, Deghosting Using a Twin Streamer Configuration, Geophysical Prospecting, 1993). Note, however, as the traces within a said CMPO or CDPO gather have substantially the same source-sensor offset or, at least, a similar one as described above, the thus constructed and substantially de-ghosted trace is still characterized by a source-sensor offset. Therefore, it is collected in the superordinate CMP or CDP gather with the source-sensor offset still being meaningful. Repeating the above process for each CMPO or CDPO gather, hence, populates the superordinate CMP or CDP gather with a multitude of traces, each of which substantially deghosted and being characterized by a source-sensor offset—thus, the process creates a pre-stack and substantially de-ghosted CMP or CDP gather with full bandwidth.

From thereon, conventional processing all the way through migration can be applied, with no need to further consider the variable depth of seismic sensors.

While this invention has been described with respect to a limited number of embodiments, those skilled in the art, having benefit of this disclosure, will appreciate that other embodiments can be devised which do not depart from the scope of the invention disclosed.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously. Any reference signs in the claims should not be construed as limiting the scope of the invention.

We claim:

1. A method for acquiring and processing marine seismic data, comprising the steps of:
   translating, by a first marine vessel, at least one first seismic source for emitting at least one first seismic signal;
   translating, by the first or at least one additional marine vessel, at least one additional seismic source for emitting at least one additional seismic signal;
   translating, by any marine vessel at least one streamer comprising at least one first seismic sensor for receiving said first seismic signal and at least one additional seismic sensor for receiving said additional seismic signal, with said at least one first and said at least one additional seismic sensor being arranged at different sensor depths for varying the frequency of suppression in the seismic signals due to ghosting;
   collecting information on the locations of said seismic sources and seismic sensors;
   arranging said first and additional seismic sources and said first and additional seismic sensors, based at least in part on their respective collected location information, for receiving, over time, at least one said first seismic signal emitted by a said first seismic source and received by a said first seismic sensor and at least one said additional seismic signal emitted by a said additional seismic source and received by a said additional seismic sensor, wherein the source-sensor offset of the emitting said first seismic source and the receiving said first seismic sensor is substantially the same as the source-sensor offset of the emitting said additional seismic source and the receiving said additional seismic sensor, and wherein the common mid-point of the emitting said first seismic source and the receiving said first seismic sensor is substantially the same as the common mid-point of the emitting said additional seismic source and the receiving said additional seismic sensor, and wherein the receiving said first seismic sensor and the receiving said additional seismic sensor are at different sensor depths, the sensor depths at least different enough to enable identification of seismic signals originating from ghosting;

recording the received seismic signals;

gathering the two or more recorded seismic signals having substantially the same source-sensor offset and substantially the same common mid-point and different sensor depths, wherein at least two of the gathered recorded seismic signals are acquired using different seismic sensor depths; and de-ghosting the gathered two or more recorded seismic signals, whereby a synthesized record with a substantially de-ghosted seismic signal is created.

2. The method according to claim 1 wherein actuation of the first and additional seismic sources are selected from the group of: actuating independently, actuating sequentially, and actuating simultaneously.

3. The method according to claim 1 wherein the first and additional seismic sources are actuated randomly.

4. The method according to claim 1 wherein at least one of said at least one streamer is translated by the first marine vessel.

5. The method according to claim 1 wherein at least one additional streamer is translated by the additional marine vessel.

6. The method according to claim 1 wherein the additional seismic source is translated ahead or behind the first seismic source along a survey line.

7. The method according to claim 1 wherein said first or additional seismic source is translated parallel and offset to a survey line.

8. The method according to claim 7 wherein the additional seismic source is translated ahead or behind the first seismic source parallel and offset to the survey line.

9. The method according to claim 1 wherein the first or additional seismic sources are translated at an angle to a survey line.

10. The method of claim 1 wherein de-ghosting comprises brute stacking.

11. The method of claim 1 wherein de-ghosting comprises pre-stack de-convolution, and stacking.

12. The method of claim 1 wherein de-ghosting comprises matched filtering, pre-stack de-convolution, and stacking.

13. The method of claim 1 wherein a record of a first or an additional signal is transformed by means of applying reciprocity into a record that would have been obtained if the source and sensor location of said record were interchanged.

14. The method of claim 1 further comprises gathering a plurality of synthesized records having a substantially common mid-point.

15. A method of processing marine seismic data comprising:

gathering two or more recorded seismic signals having substantially the same source-sensor offset and substantially the same common mid-point at different sensor depths, the sensor depths at least different enough to enable identification of seismic signals originating from ghosting; and de-ghosting the gathered two or more recorded seismic signals, whereby a synthesized record with a substantially de-ghosted seismic signal is created.

16. The method of claim 15 wherein de-ghosting comprises brute stacking.

17. The method of claim 15 wherein de-ghosting comprises pre-stack de-convolution, and stacking.

18. The method of claim 15 wherein de-ghosting comprises matched filtering, pre-stack de-convolution, and stacking.

19. The method of claim 15 wherein a record of a first or an additional signal is transformed by means of applying reciprocity into a record that would have been obtained if the source and sensor location of said record were interchanged.

20. The method of claim 15 further comprises gathering a plurality of synthesized records having a substantially common mid-point.

* * * * *